United States Patent
Xin et al.

(10) Patent No.: US 11,516,846 B2
(45) Date of Patent: Nov. 29, 2022

(54) RTA PACKET DUPLICATION IN TIME AND FREQUENCY

(71) Applicant: SONY GROUP CORPORATION, Tokyo (JP)

(72) Inventors: Liangxiao Xin, San Jose, CA (US); Mohamed Abouelseoud, San Francisco, CA (US)

(73) Assignee: SONY GROUP CORPORATION, Tokyo (JP)

( * ) Notice: Subject to any disclaimer, the term of this patent is extended or adjusted under 35 U.S.C. 154(b) by 94 days.

(21) Appl. No.: 17/116,072

(22) Filed: Dec. 9, 2020

(65) Prior Publication Data

US 2021/0352722 A1    Nov. 11, 2021

Related U.S. Application Data

(60) Provisional application No. 63/022,692, filed on May 11, 2020.

(51) Int. Cl.
*H04W 74/08* (2009.01)
*H04W 72/10* (2009.01)
*H04W 84/12* (2009.01)

(52) U.S. Cl.
CPC ....... *H04W 74/0816* (2013.01); *H04W 72/10* (2013.01); *H04W 84/12* (2013.01)

(58) Field of Classification Search
CPC . H04W 74/0816; H04W 72/10; H04W 84/12; H04L 1/0003
See application file for complete search history.

(56) References Cited

U.S. PATENT DOCUMENTS

| 2001/0023445 A1 | 9/2001 | Sundqvist |
| 2003/0108059 A1 | 6/2003 | Yew |

(Continued)

FOREIGN PATENT DOCUMENTS

EP    1686716 A1    8/2006

OTHER PUBLICATIONS

Laselva, Daniela et al., "Deliverable D3.2 Recommended Multi-Service Performance Optimization Solutions for Improved E2E Performance", Call:H2020-ICT-2016-2, Project reference: 760809, Project Name: E2E-aware Optimizations and advancements for Network Edge of 5G New Radio (ONE5G), May 31, 2019, 150 pages.

*Primary Examiner* — Mohammad S Anwar
(74) *Attorney, Agent, or Firm* — O'Banion & Ritchey LLP; John P. O'Banion

(57) ABSTRACT

A wireless station and protocols for a wireless local area network (WLAN) to support real-time application (RTA) packets in setting up an unsolicited retry policy for RTA packets within a TXOP in which the station retransmits RTA packets in time and frequency domains without waiting for feedback. Setting up block acknowledgement (BA) agreements to receive feedback for adapting future packet transmissions. Dropping an RTA packet if a retry count for that packet exceeds the unsolicited retry limit, or a lifetime of that packet has expired. Supporting multi-link devices (MLDs) including access point multi-link devices (AP-MLDs) for performing simultaneous transmit/receive (STR), and non-access point multi-link device (non-AP MLDs) which are not configured for simultaneous transmit/receive (non-STR).

20 Claims, 27 Drawing Sheets

(56) References Cited

U.S. PATENT DOCUMENTS

| | | | |
|---|---|---|---|
| 2005/0135408 A1* | 6/2005 | Han | H04L 12/413 370/445 |
| 2005/0190771 A1 | 9/2005 | Tan | |
| 2015/0089080 A1* | 3/2015 | Alsup | H04L 49/90 709/235 |
| 2016/0381716 A1* | 12/2016 | Venkatesan | H04W 76/30 370/328 |
| 2018/0123765 A1* | 5/2018 | Cao | H04L 1/1614 |
| 2020/0099482 A1 | 3/2020 | Yu | |

* cited by examiner

FIG. 1

| Element ID | Length | TS Info | Nominal MSDU Size | Maximum MSDU Size | Minimum Service Interval | Maximum Service Interval | Inactivity Interval | Suspension Interval |

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |

FIG. 2

| Traffic Type | TSID | Direction | Access Policy | Aggregation | APSD | User Priority | TSInfo Ack Policy | Schedule | Reserved |

FIG. 3

| Element ID | Length | User Priority | Frame Classifier |

FIG. 8

110 → Frame Control | Duration | Address 1 | Address 2 | Address 3 | Sequence Control | HT Control | Action | FCS Element ID | Length | LLTS Descriptor List ← LLTS Request element →

FIG. 9

130 → LLID | LL Length | Request Type | TCLAS | TCLAS Processing (Optional) | RTA-TSPEC | Optional Subelements

FIG. 10

150 → TSPEC | RTA Attributes

Reliability | Jitter | MSDU Lifetime | Deterministic Service | Nominal Service Interval

| Subelement ID | Length | LLTS Retransmission Policy | Unsolicited retry limit | MPDU lifetime | Duplication in Time Allowance | Duplication in ML Allowance |

| Maximum number of links | Allowed combinations of links | Duplication in RU Allowance | Maximum number of RUs | Allowed combinations of RUs |

| Frame Control | Duration | Address 1 | Address 2 | Address 3 | Sequence Control | HT Control | Action | FCS |

| Element ID | Length | LLTS Status List |

←— LLTS Response element —→

| LLID | LL Length | Response Type | Last Sequence Control | TCLAS | TCLAS Processing (optional) | RTA-TSPEC | Optional Subelements |

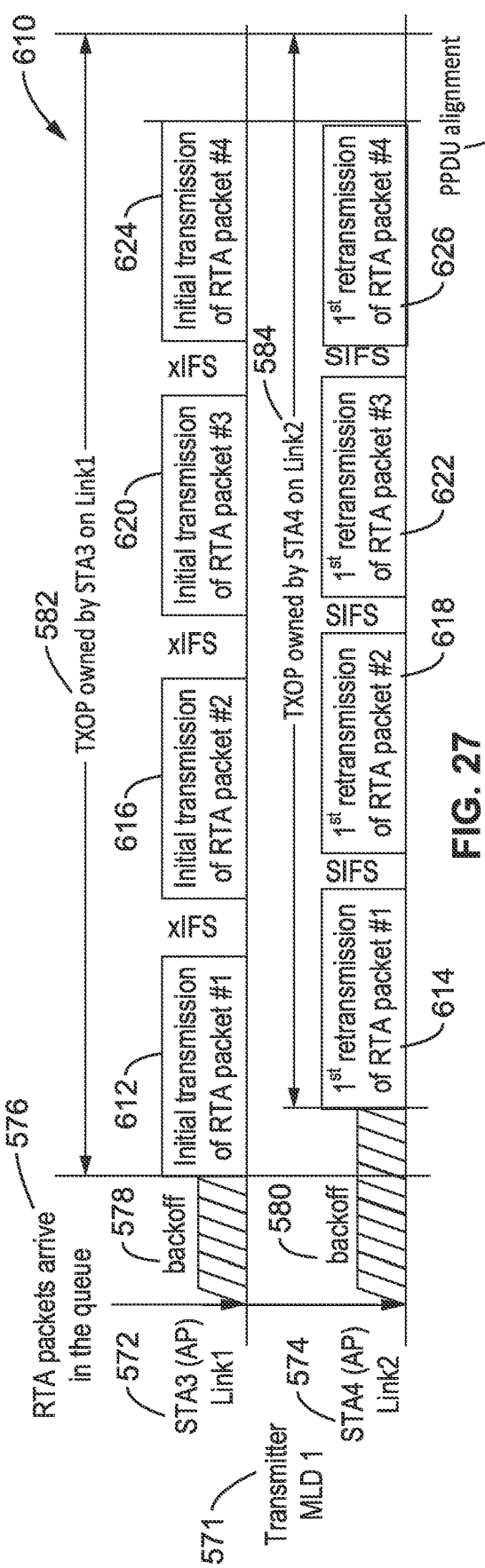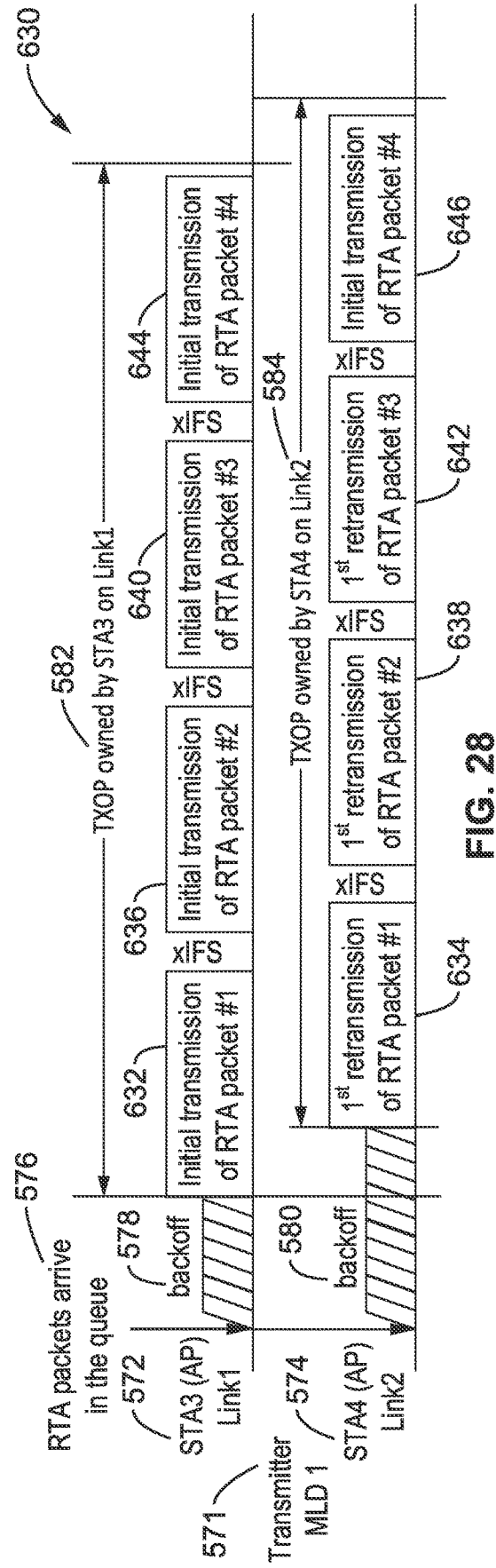

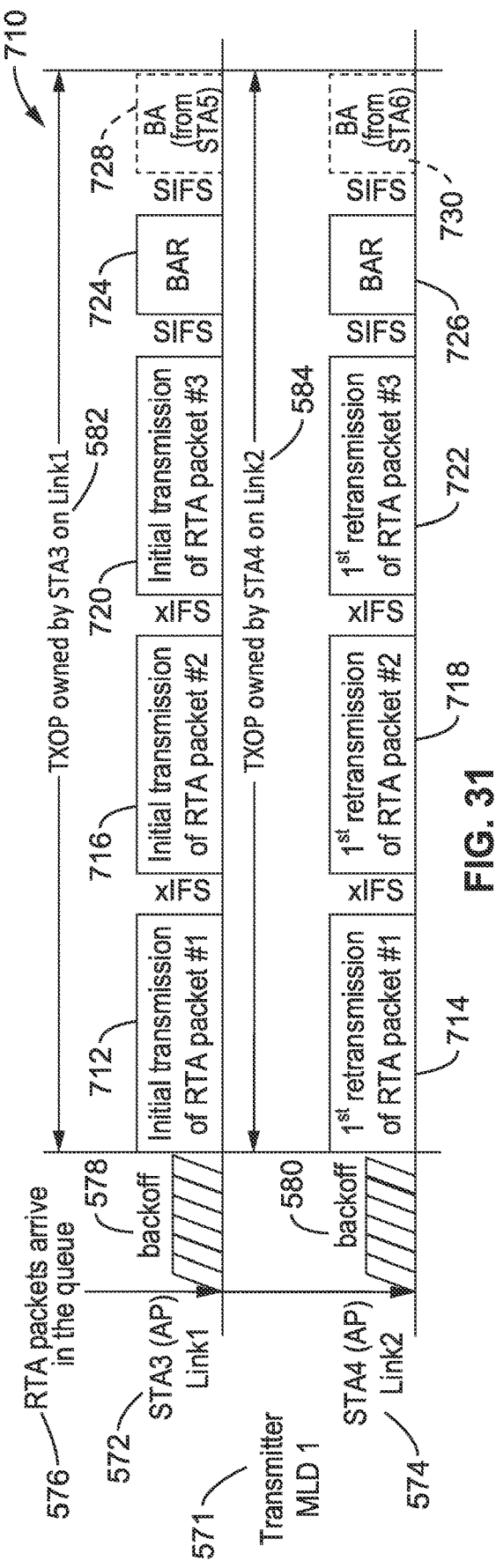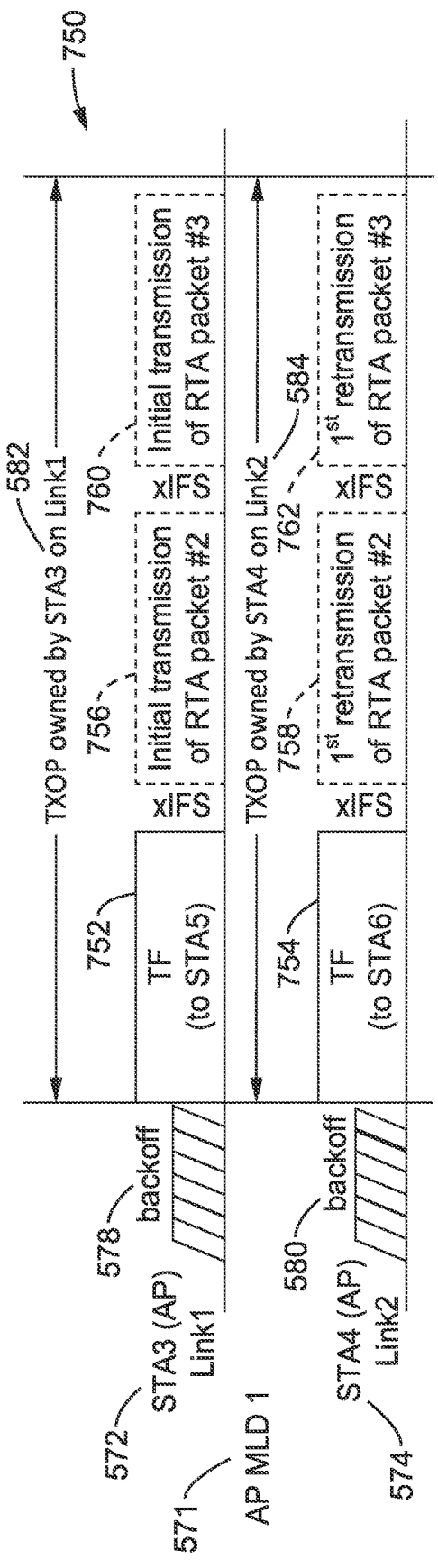
FIG. 31
FIG. 32

RTA PACKET DUPLICATION IN TIME AND FREQUENCY

CROSS-REFERENCE TO RELATED APPLICATIONS

This application claims priority to, and the benefit of, U.S. provisional patent application Ser. No. 63/022,692 filed on May 11, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication networks (WLANS) using CSMA/CA, and more particularly to WLANS using CSMA/CA which duplicate Real Time Application (RTA) packets with respect to time and/or frequency domains, and transmit these packets during the same TXOP period.

2. Background Discussion

Current wireless technologies using CSMA/CA focus primarily on increasing network throughput performance, yet they lack low latency capability.

However, an increasing number of applications, such as real time applications (RTA), require low latency and thus a technology gap has arisen. An RTA requires low latency communication and uses best effort communications in present wireless networks. RTA packets require low latency due to their high timeliness requirement on packet delivery. An RTA packet is only valid when it is delivered within a certain period of time.

Existing technologies for the retransmission scheme do not meet the timeliness requirement of RTA packets and are not configured to minimize RTA packet transmission latency.

Accordingly, a need exists for enhanced handling of RTA transmissions and retransmissions. The present disclosure fulfills that need and provides additional benefits over previous technologies.

BRIEF SUMMARY

The present disclosure operates in a CSMA/CA WLAN and distinguishes Real-Time Application (RTA) traffic from non-RTA traffic and handles the RTA traffic in a manner which takes the timeliness of the packet into consideration, since RTA packets have to be transmitted within a limited lifetime or otherwise they are invalid. In this protocol the stations (STAs) schedule the retransmission of RTA packets based on their lifetime.

In particular, the present disclosure separates the retransmission scheme for RTA packets from non-RTA packets, while non-RTA packets can still use the regular retransmission scheme defined in CSMA/CA. The proposed technology defines an unsolicited retry scheme for RTA traffic to transmit and retransmit the RTA packets in the same period of Transmit Opportunity (TXOP). The present disclosure allows the STA to obtain the TXOP on multiple link devices (MLDs) to transmit the initial transmission of the RTA packets on one link and retransmit their retransmissions on the other link(s). The present disclosure is compatible with Orthogonal Frequency Division Multiple Access (OFDMA) systems. The present disclosure allows the STA to use one Resource Unit (RU) to transmit the initial transmission of an RTA packet and another RU to transmit its retransmissions in the same Multi-User (MU) PPDU packet. It will be noted that a PPDU is a Physical Layer Conformance Procedure (PLCP) Protocol Data Unit (PPDU). The present disclosure allows the STA to set up a Block Acknowledgement (BA) agreement for RTA packets to obtain packet loss information on multiple links to adapt future packet transmissions. It should be appreciated that the packet transmissions may also be adapted for example by using a Modulation Coding Scheme (MCS), unsolicited retry limit, or other adaptions, without departing from the teachings of the present disclosure.

Further aspects of the technology described herein will be brought out in the following portions of specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a Traffic Specification (TSPEC) defined in IEEE 802.11.

FIG. 2 is a data field diagram of a Traffic Stream (TS) Information field defined in IEEE 802.11.

FIG. 3 is a data field diagram of a Traffic Classification (TCLAS) Information field defined in IEEE 802.11.

scenario, one of which is configured for Multi-link Devices (MLDs), according to at least one embodiment of the present disclosure.

Figure 7:
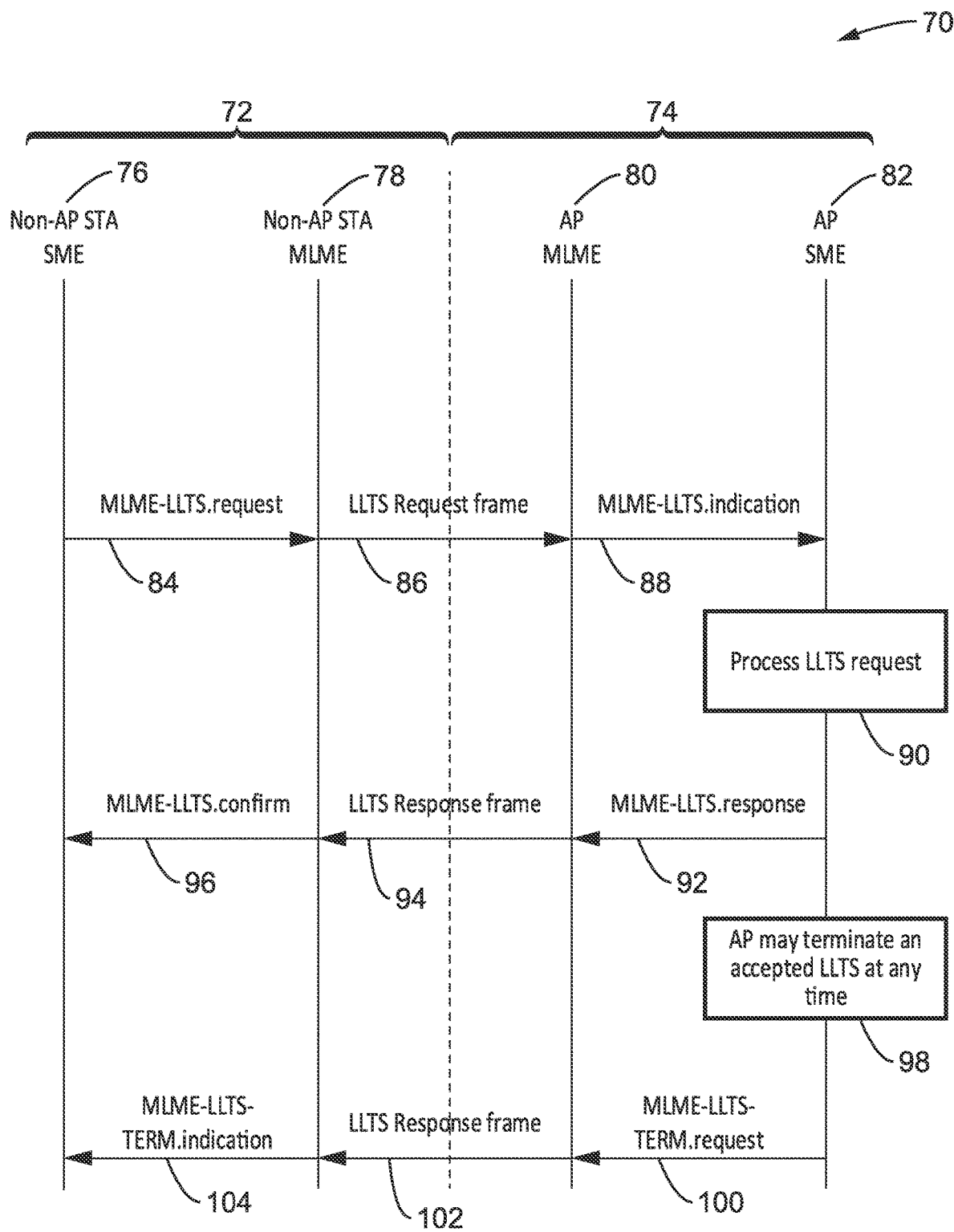

FIG. 7 is a communication sequence diagram of Low latency Transmission Service (LLTS) setup according to at least one embodiment of the present disclosure.

FIG. 8 is a data field diagram of a Low latency Transmission Service (LLTS) Request frame according to at least one embodiment of the present disclosure.

FIG. 9 is a data field diagram of a Low latency Transmission Service (LLTS) descriptor frame according to at least one embodiment of the present disclosure.

FIG. 10 is a data field diagram of an RTA-TSPEC field according to at least one embodiment of the present disclosure.

FIG. 11 is a data field diagram of an optional subelement field according to at least one embodiment of the present disclosure.

FIG. 12 is a data field diagram of a Low latency Transmission Service (LLTS) Response frame according to at least one embodiment of the present disclosure.

FIG. 13 is a data field diagram of a Low latency Transmission Service (LLTS) Status frame according to at least one embodiment of the present disclosure.

Figure 14:
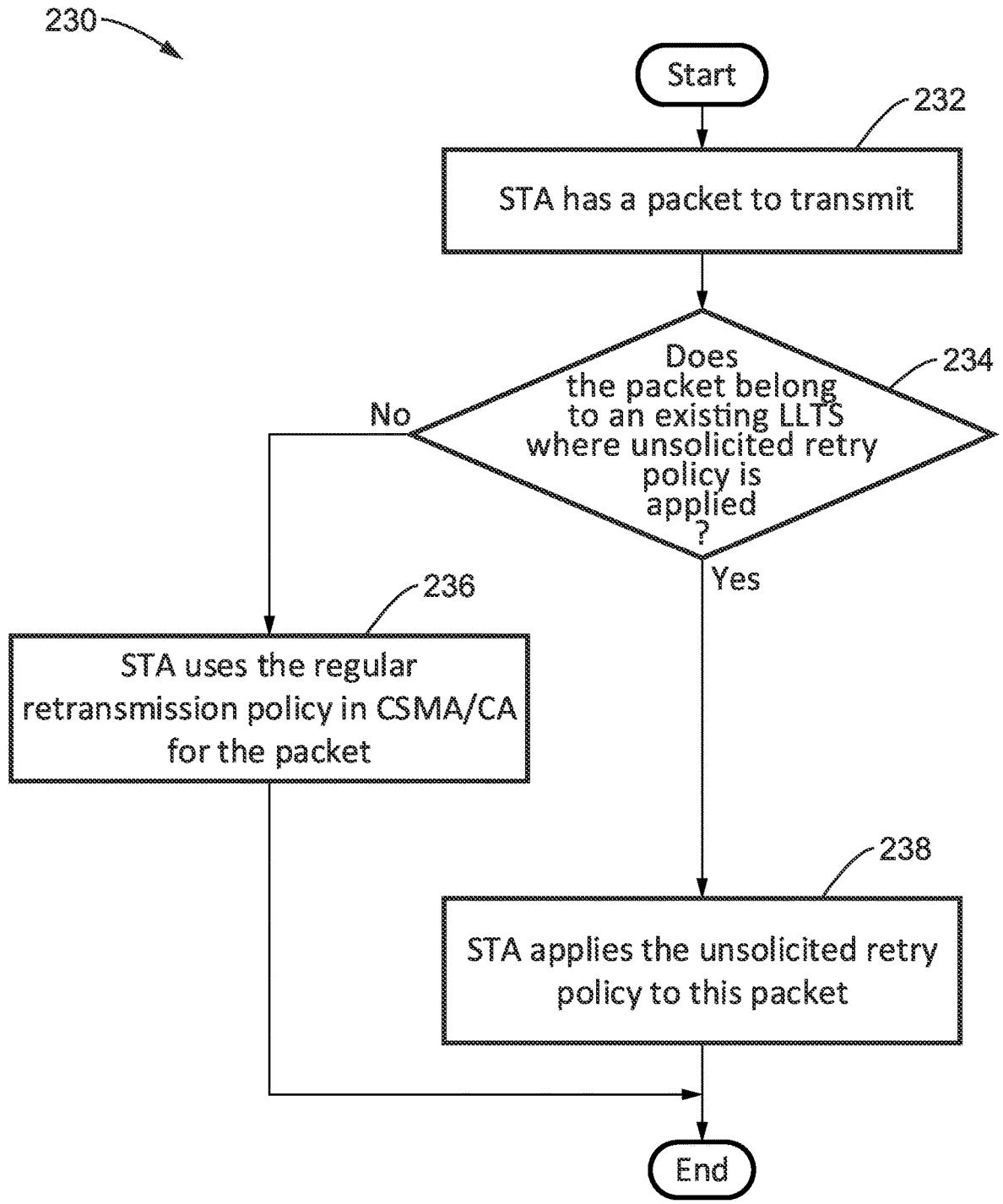

FIG. 14 is a flow diagram for a STA deciding whether to apply the unsolicited retry policy to an RTA packet according to at least one embodiment of the present disclosure.

Figure 15:
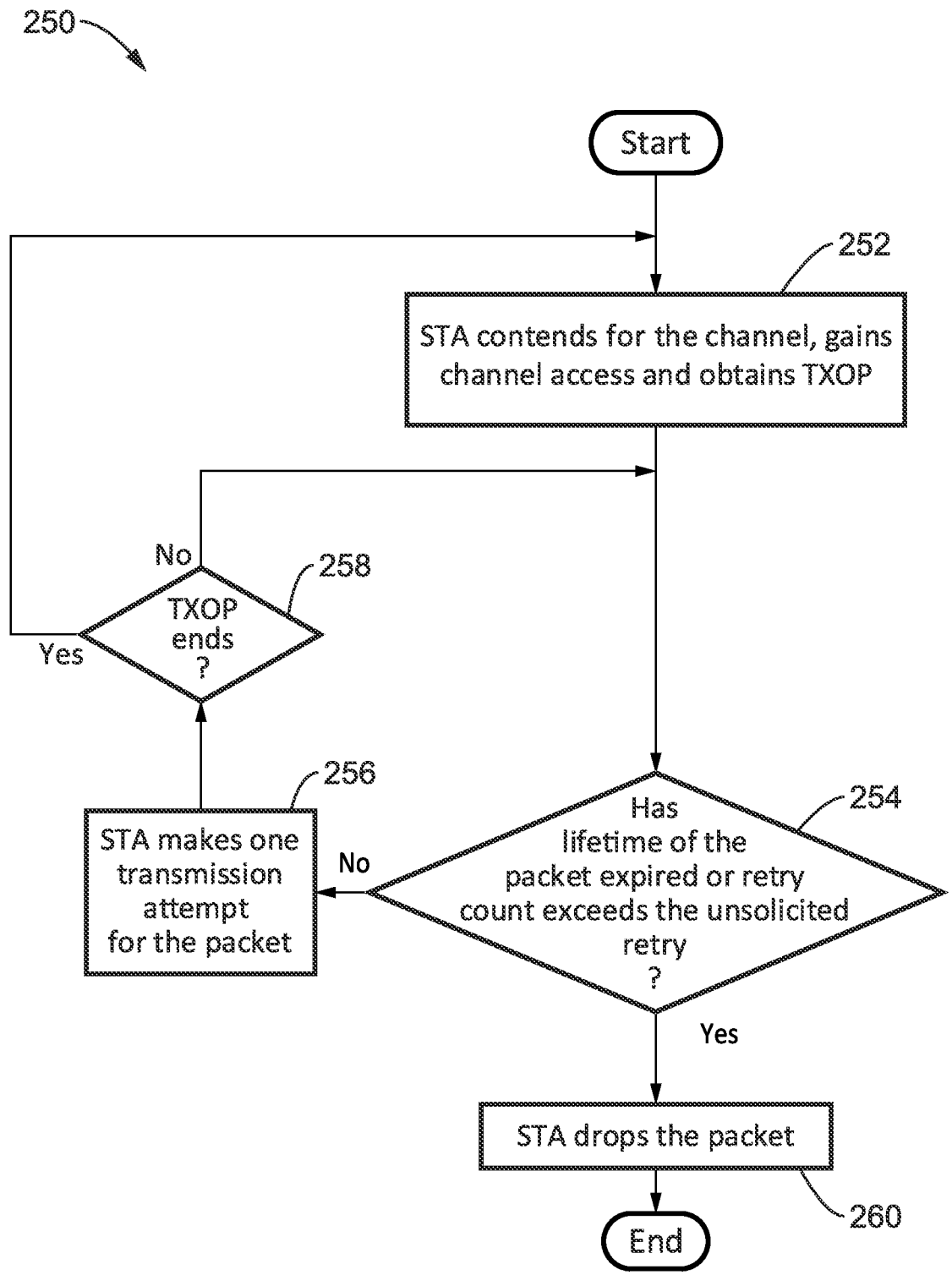

FIG. 15 is a flow diagram for a STA transmitting RTA packets with unsolicited retry is performed having packet duplication with respect to time according to at least one embodiment of the present disclosure.

Figure 16:
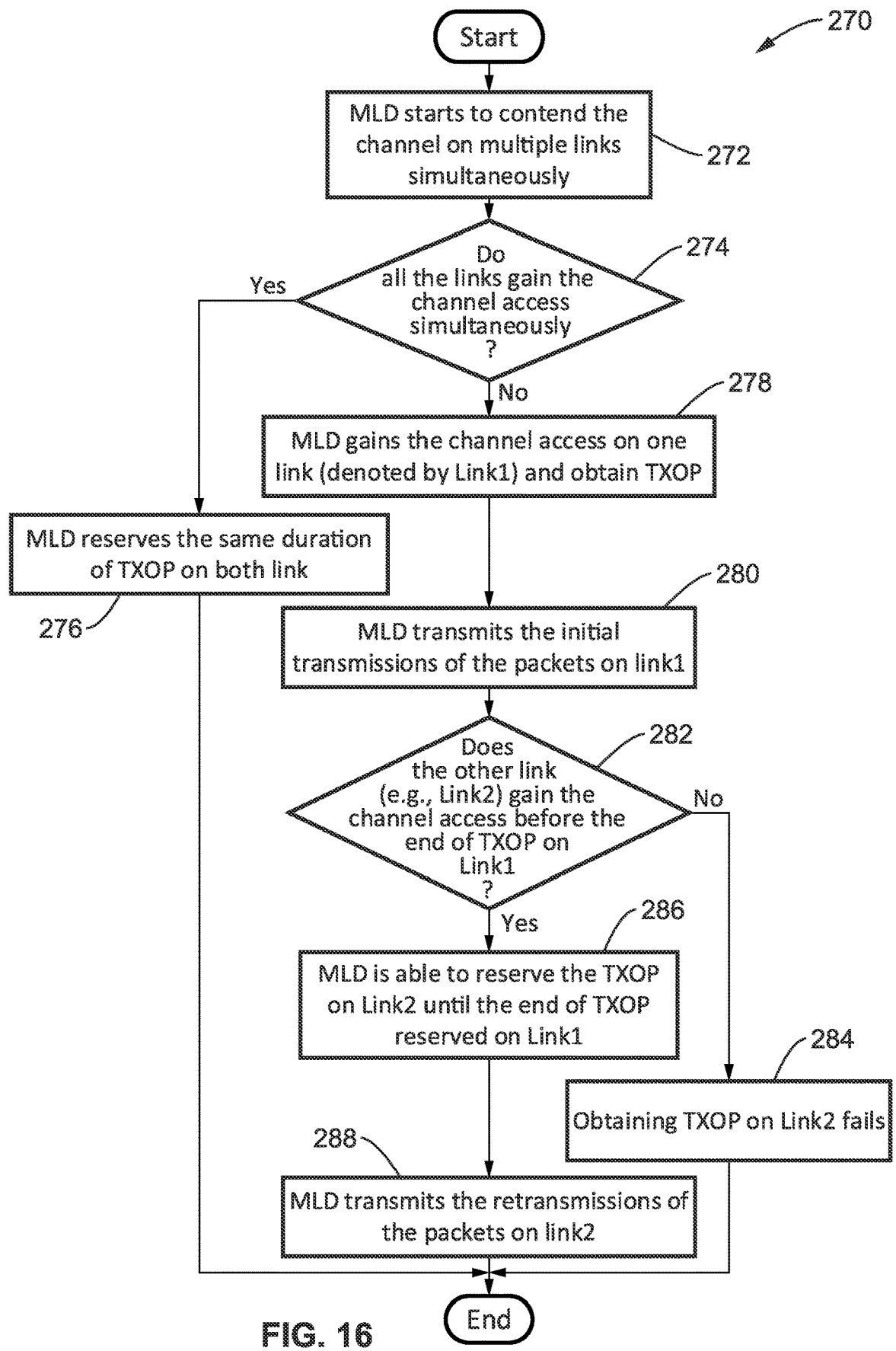

FIG. 16 is a flow diagram for a Multi-Link Device (MLD) obtaining a Transmit Opportunity (TXOP) for RTA packets with unsolicited retry in a multi-link scenario according to at least one embodiment of the present disclosure.

Figure 17A:
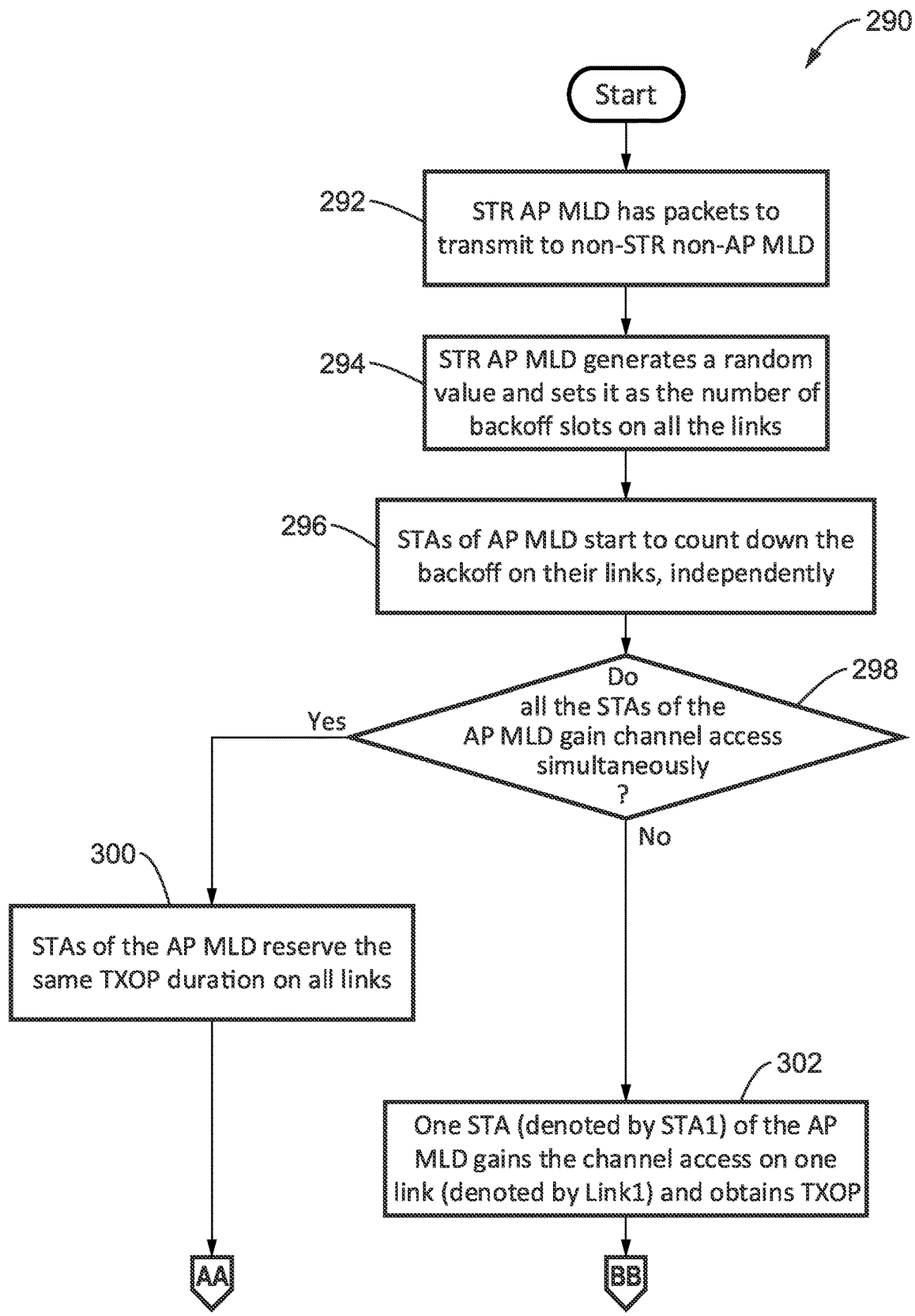
Figure 17B:
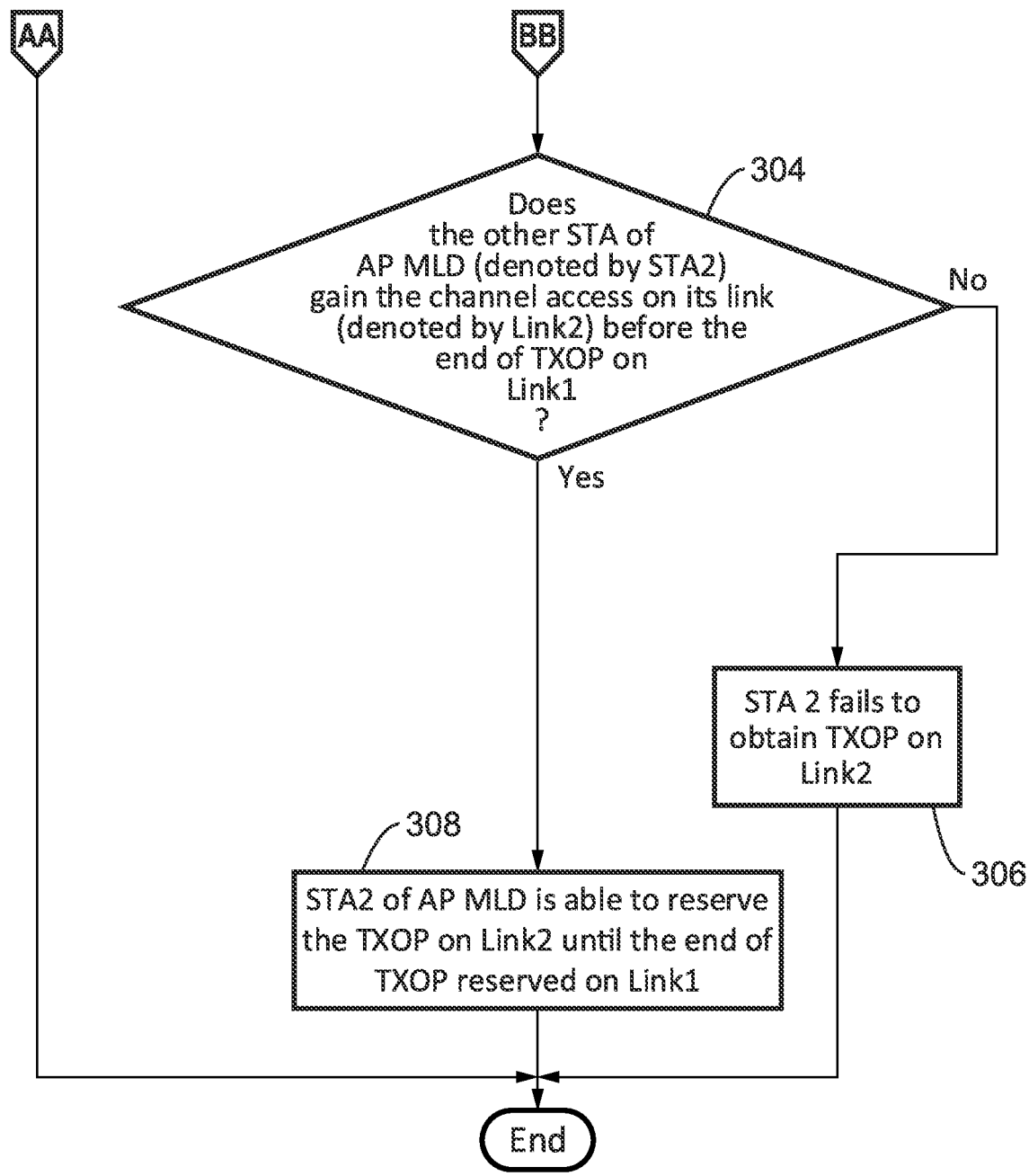

FIG. 17A and FIG. 17B is a flow diagram for an STR AP MLD obtaining a TXOP in a multi-link scenario to transmit to a non-STR non-AP MLD according to at least one embodiment of the present disclosure.

Figure 18:
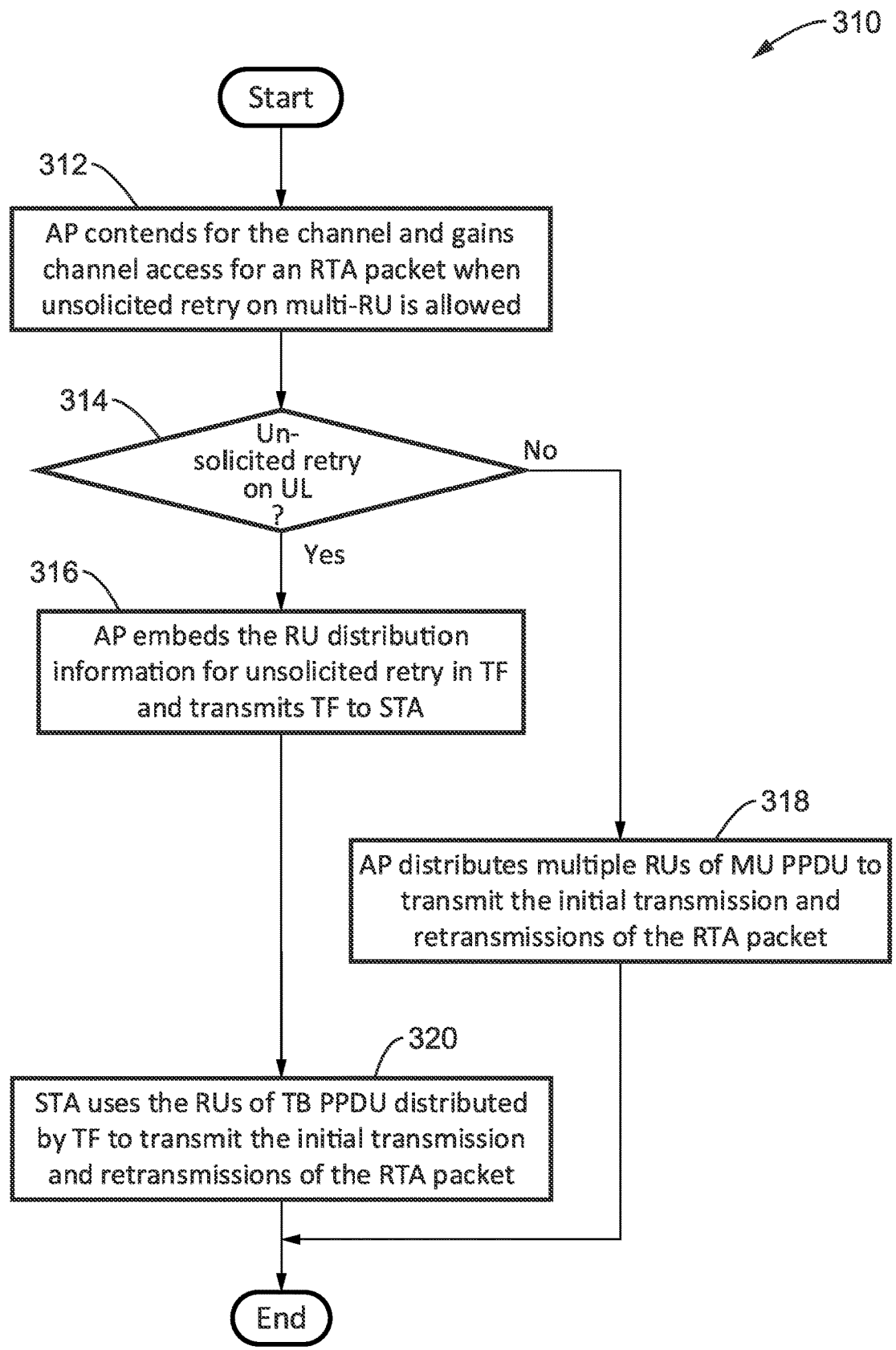

FIG. 18 is a flow diagram for transmitting an RTA packet when unsolicited retry on multiple Resource Units (RUs) is allowed according to at least one embodiment of the present disclosure.

Figure 19:
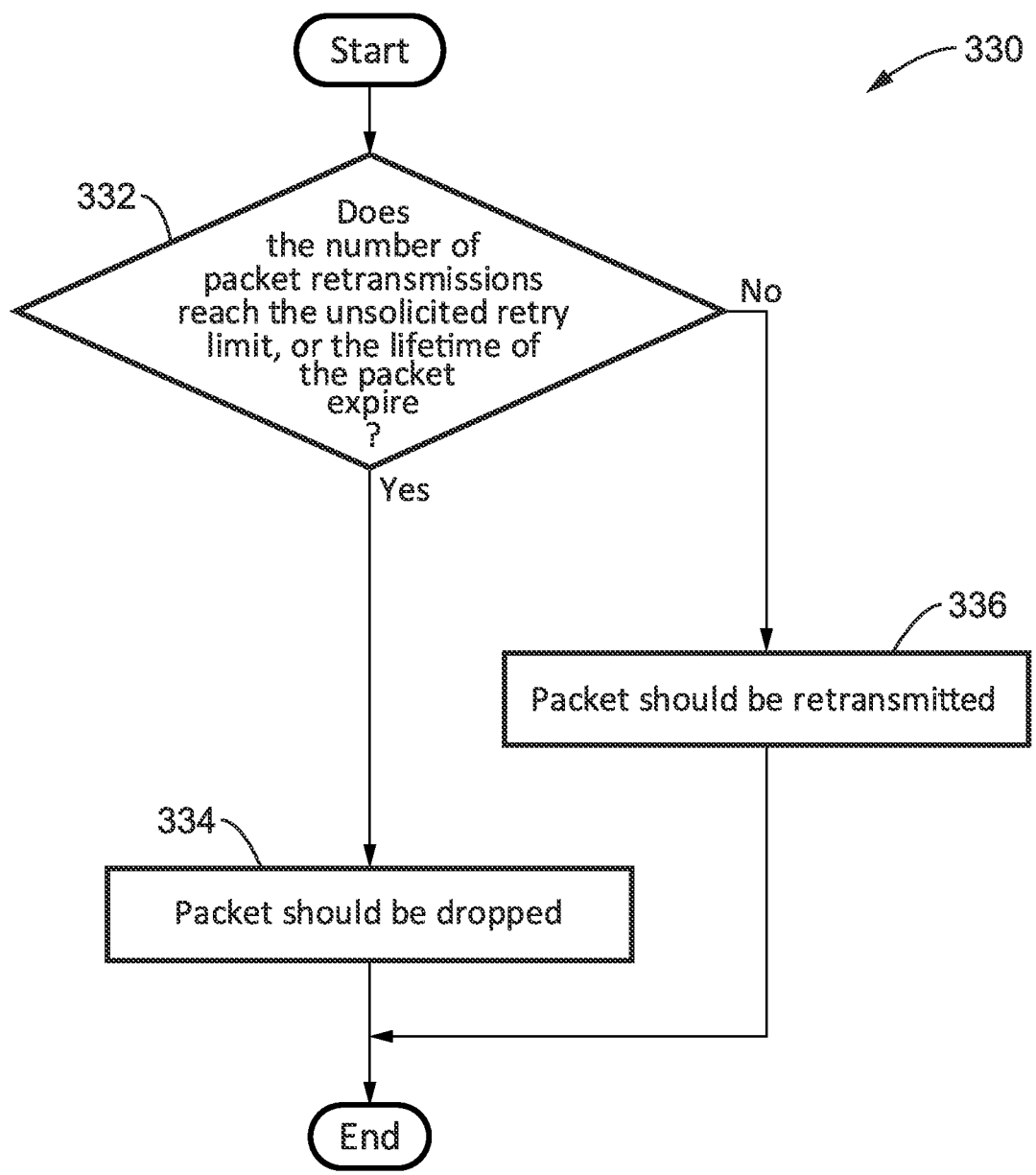

FIG. 19 is a flow diagram for a STA dropping an RTA packet when unsolicited retry is allowed according to at least one embodiment of the present disclosure.

Figure 20:
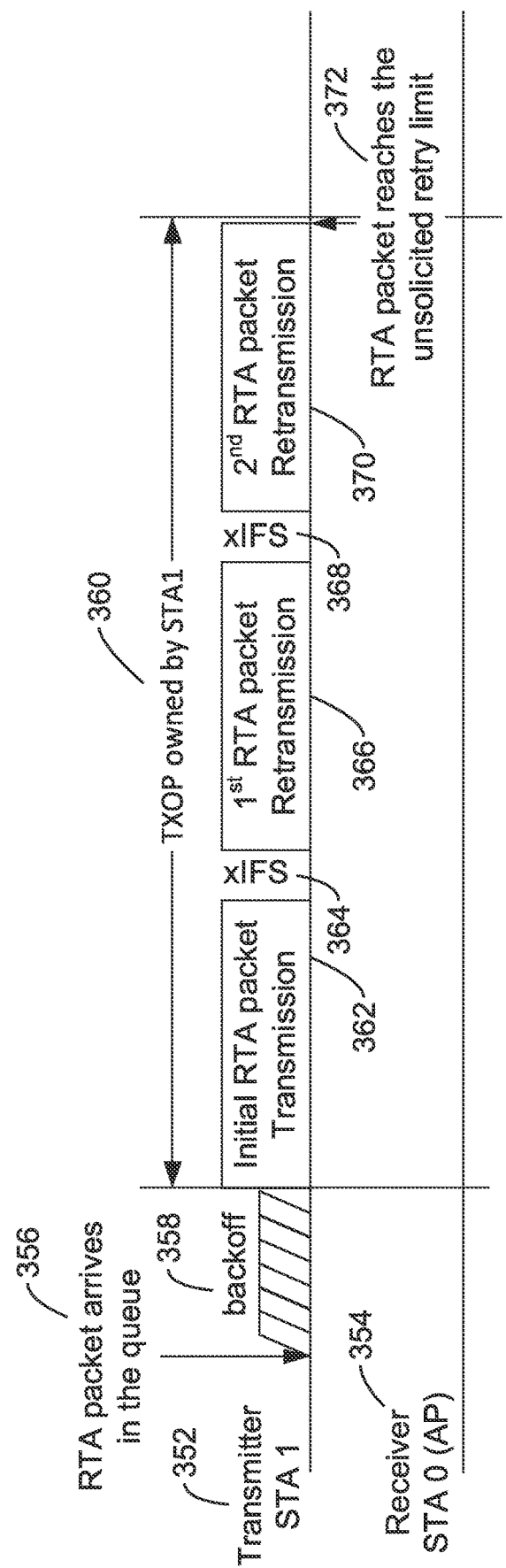

FIG. 20 is a communication sequence diagram as Example 1 of a STA transmitting an RTA packet with unsolicited retry on a single link according to at least one embodiment of the present disclosure.

Figure 21:
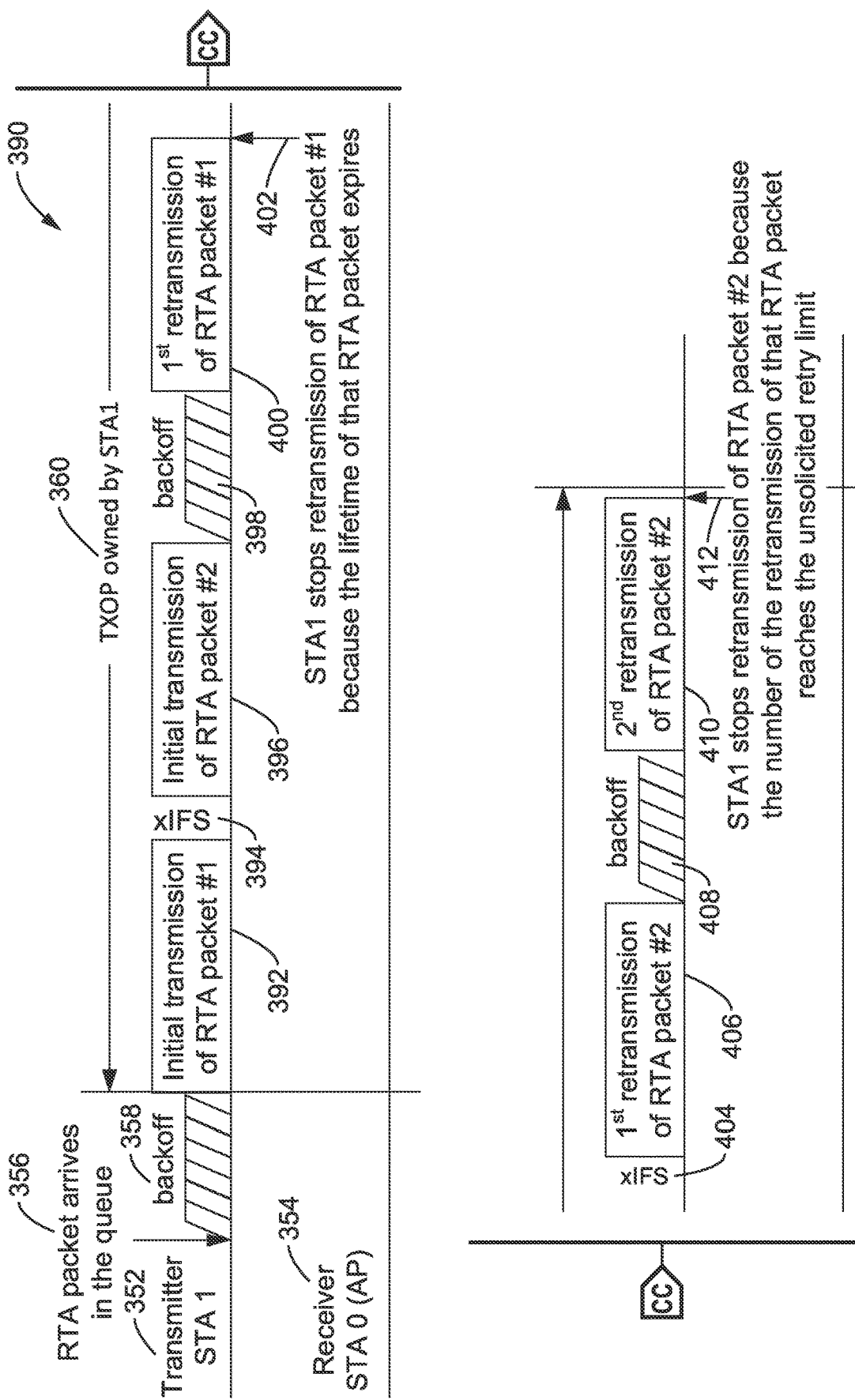

FIG. 21 is a communication sequence diagram as Example 2 of a STA transmitting an RTA packet with unsolicited retry on a single link according to at least one embodiment of the present disclosure.

Figure 22:
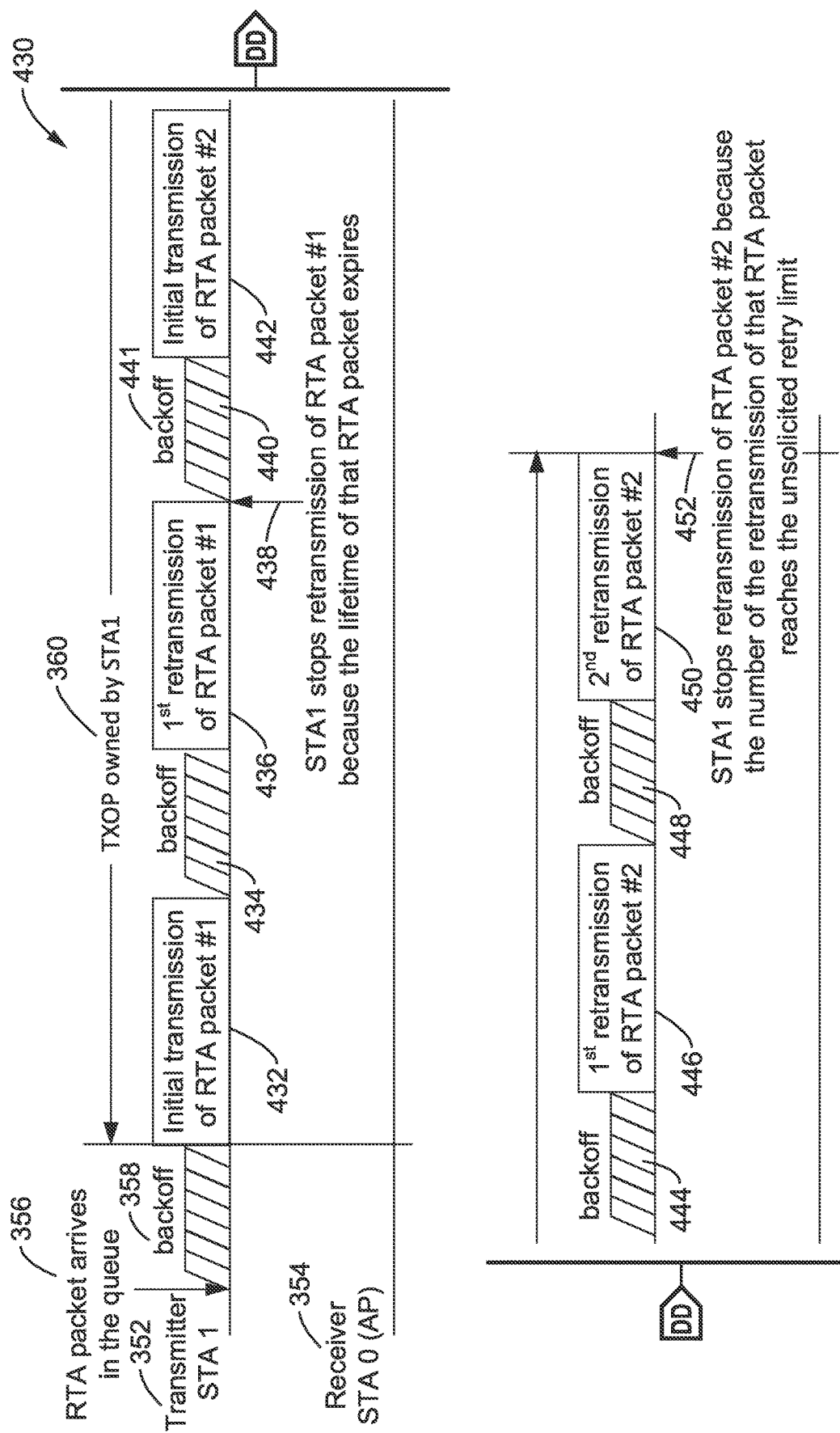

FIG. 22 is a communication sequence diagram as Example 2-1 of a STA transmitting an RTA packet with unsolicited retry on a single link according to at least one embodiment of the present disclosure.

Figure 23:
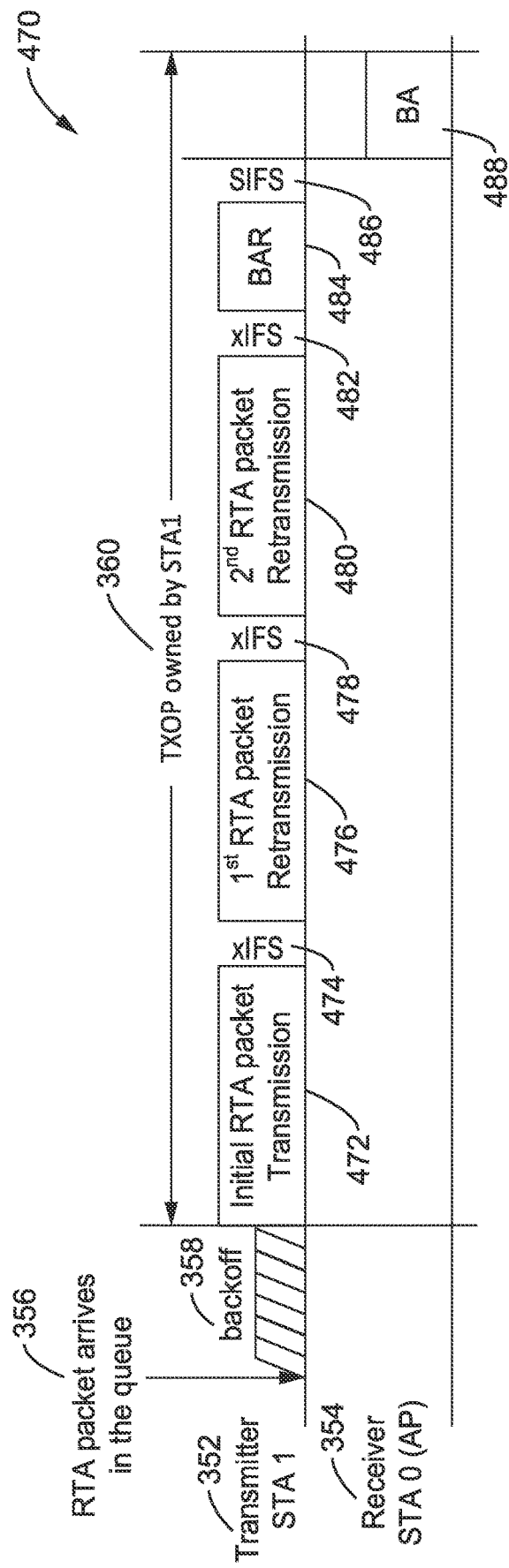

FIG. 23 is a communication sequence diagram as Example 3 of a STA transmitting an RTA packet with unsolicited retry on a single link according to at least one embodiment of the present disclosure.

Figure 24:
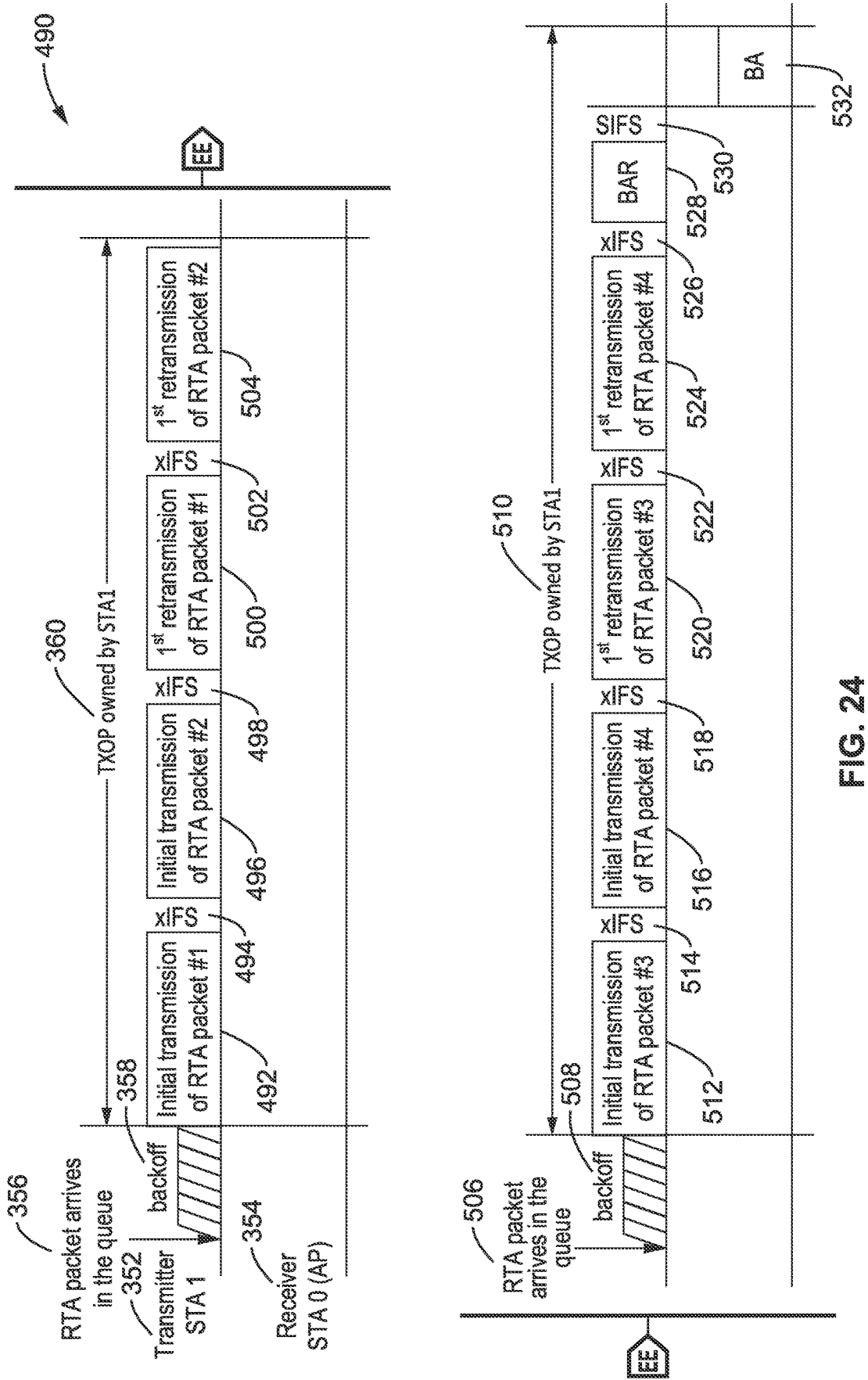

FIG. 24 is a communication sequence diagram as Example 4 of a STA transmitting an RTA packet with unsolicited retry on a single link according to at least one embodiment of the present disclosure.

Figure 25:
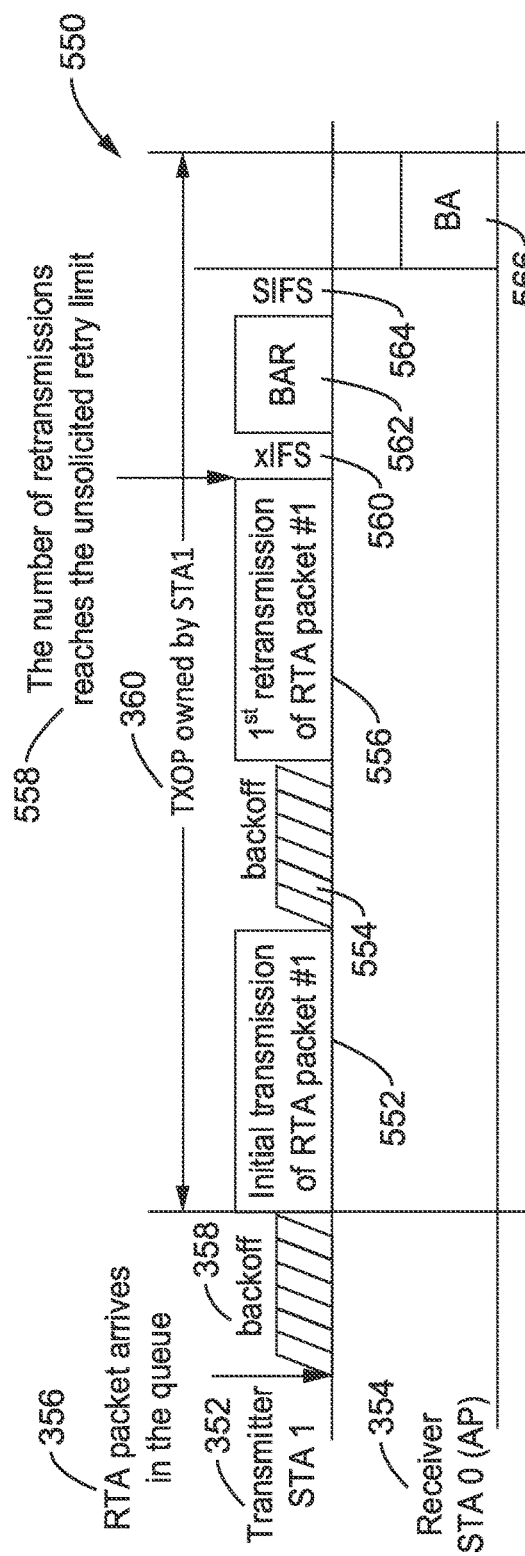

FIG. 25 is a communication sequence diagram as Example 5 of a STA transmitting an RTA packet with unsolicited retry on a single link according to at least one embodiment of the present disclosure.

Figure 26:
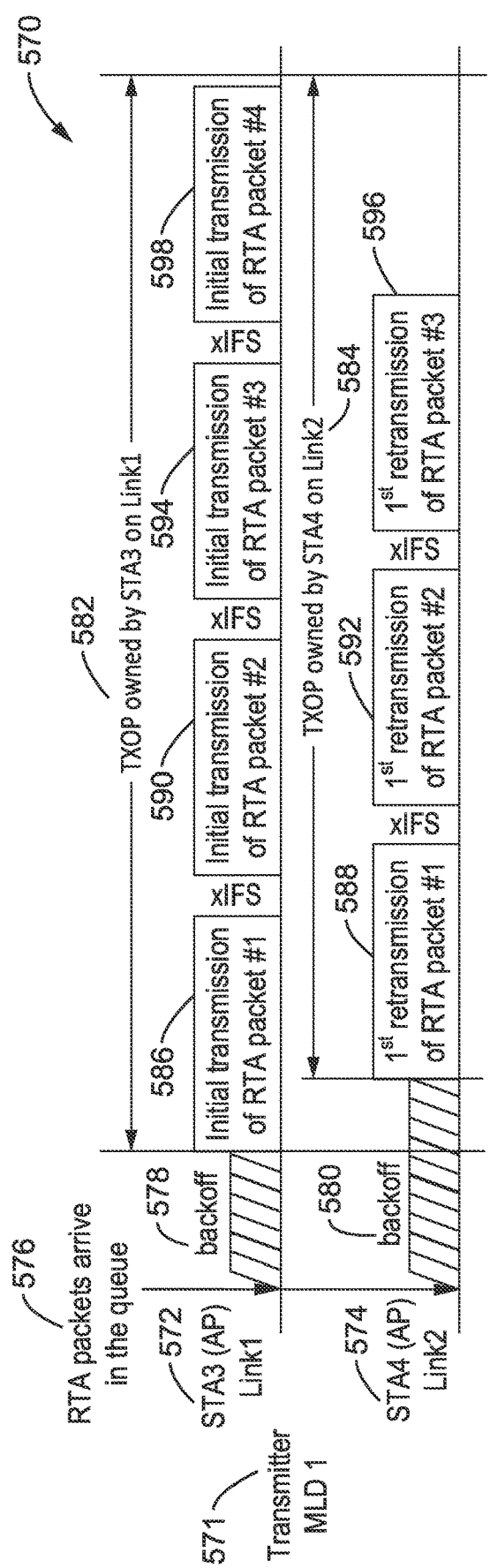

FIG. 26 is a communication sequence diagram as Example 6 of a STA transmitting an RTA packet with unsolicited retry on a single link according to at least one embodiment of the present disclosure.

FIG. 27 is a communication sequence diagram as Example 6-1 of a STA transmitting an RTA packet with unsolicited retry on a single link according to at least one embodiment of the present disclosure.

FIG. 28 is a communication sequence diagram as Example 6-1-1 of a STA transmitting an RTA packet with unsolicited retry on a single link according to at least one embodiment of the present disclosure.

Figure 29:
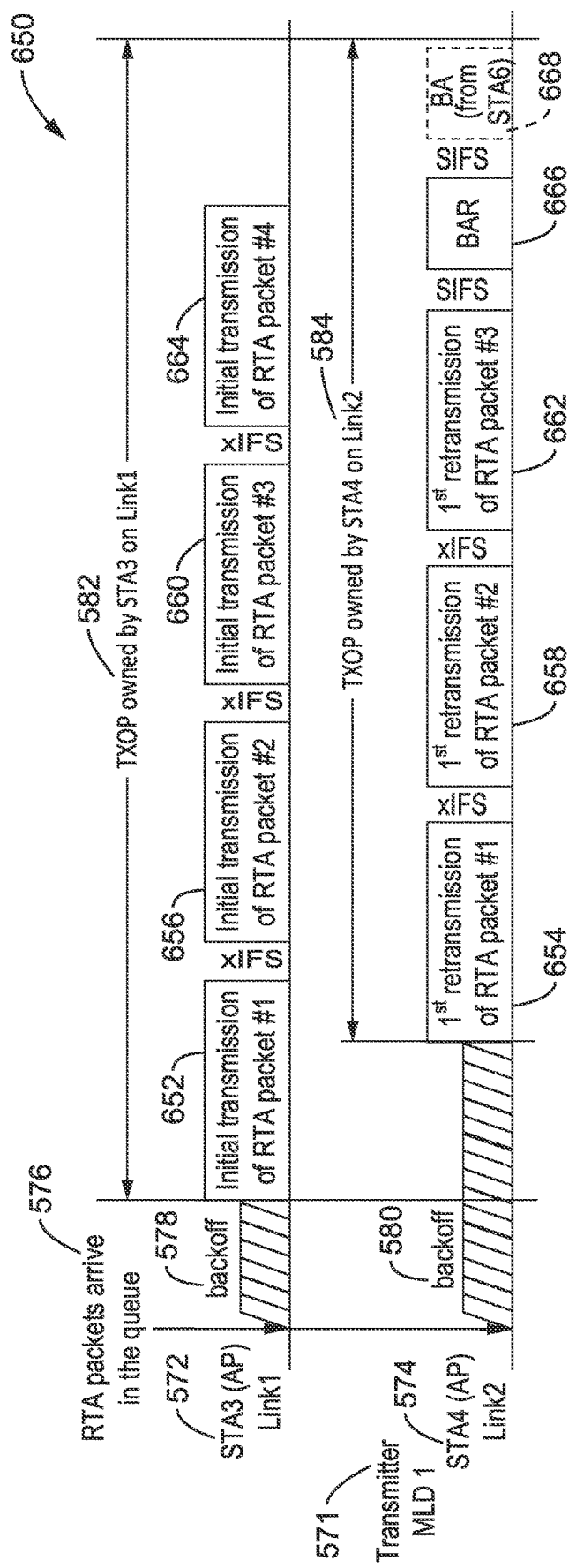

FIG. 29 is a communication sequence diagram as Example 6-2 of a STA transmitting an RTA packet with unsolicited retry on a single link according to at least one embodiment of the present disclosure.

Figure 30:
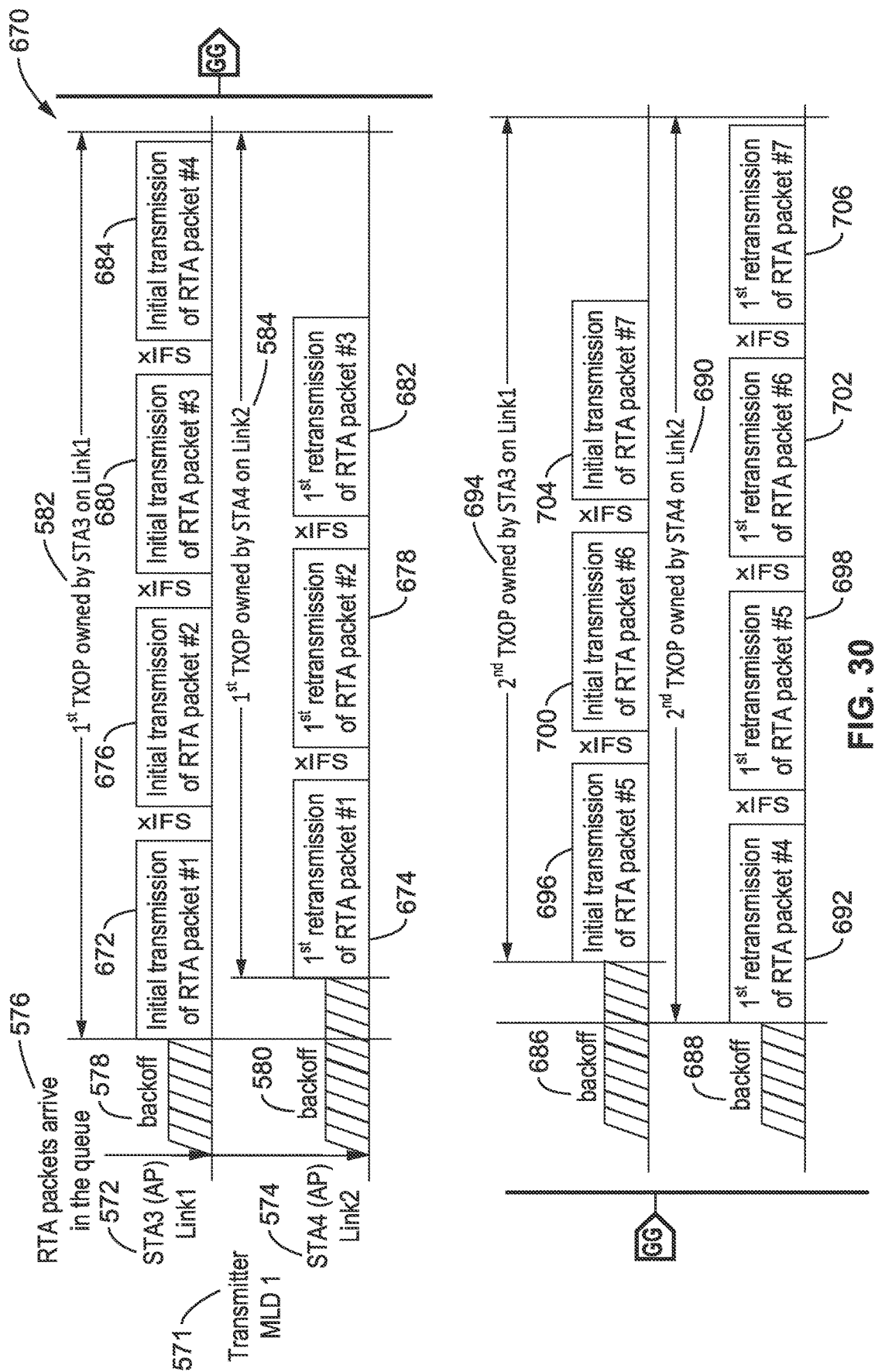

FIG. 30 is a communication sequence diagram as Example 6-3 of a STA transmitting an RTA packet with unsolicited retry on a single link according to at least one embodiment of the present disclosure.

FIG. 31 is a communication sequence diagram as Example 7 of a STA transmitting an RTA packet with unsolicited retry on a single link according to at least one embodiment of the present disclosure.

FIG. 32 is a communication sequence diagram as Example 8 of a STA transmitting an RTA packet with unsolicited retry on a single link according to at least one embodiment of the present disclosure.

Figure 33:
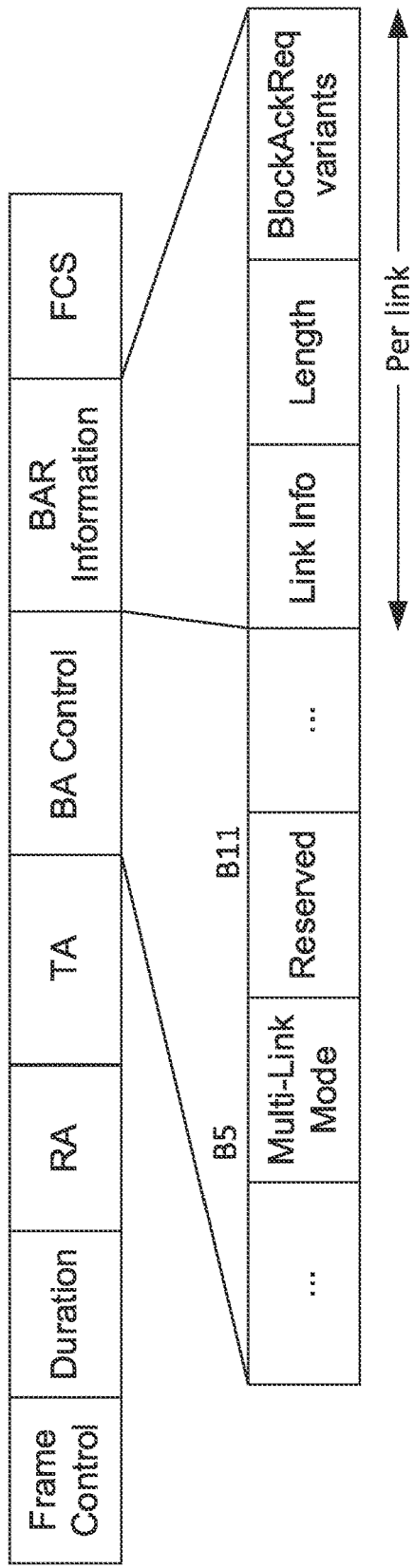

FIG. 33 is a data field diagram of a format of the Block Acknowledge Request (BAR) frame according to at least one embodiment of the present disclosure.

Figure 34:
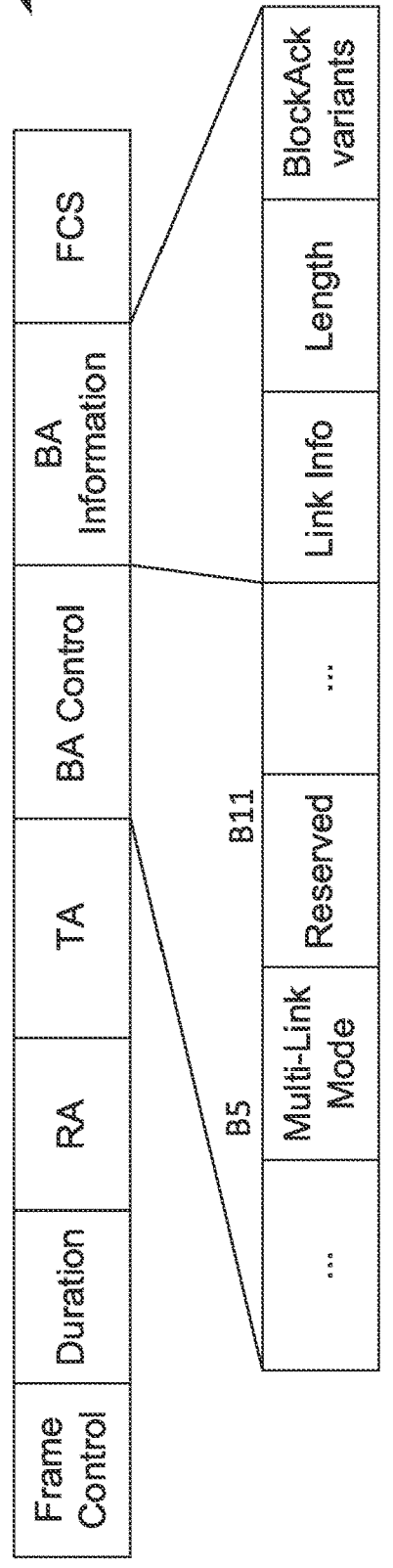

FIG. 34 is a data field diagram of a Block Acknowledge (BA) Response frame according to at least one embodiment of the present disclosure.

Figure 35:
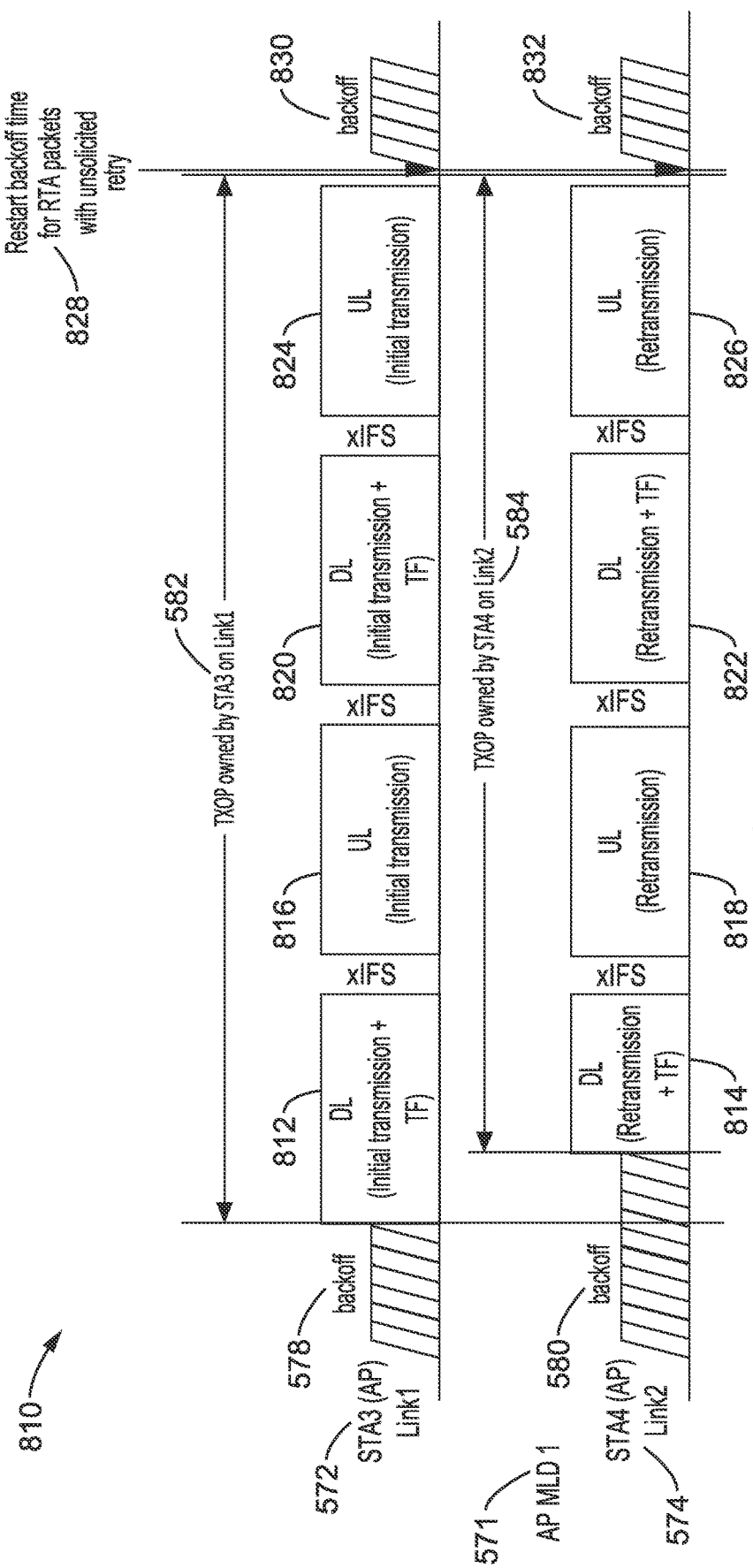

FIG. 35 is a communication sequence diagram as Example 9 of a STA transmitting an RTA packet with unsolicited retry on multiple links according to at least one embodiment of the present disclosure.

Figure 36:
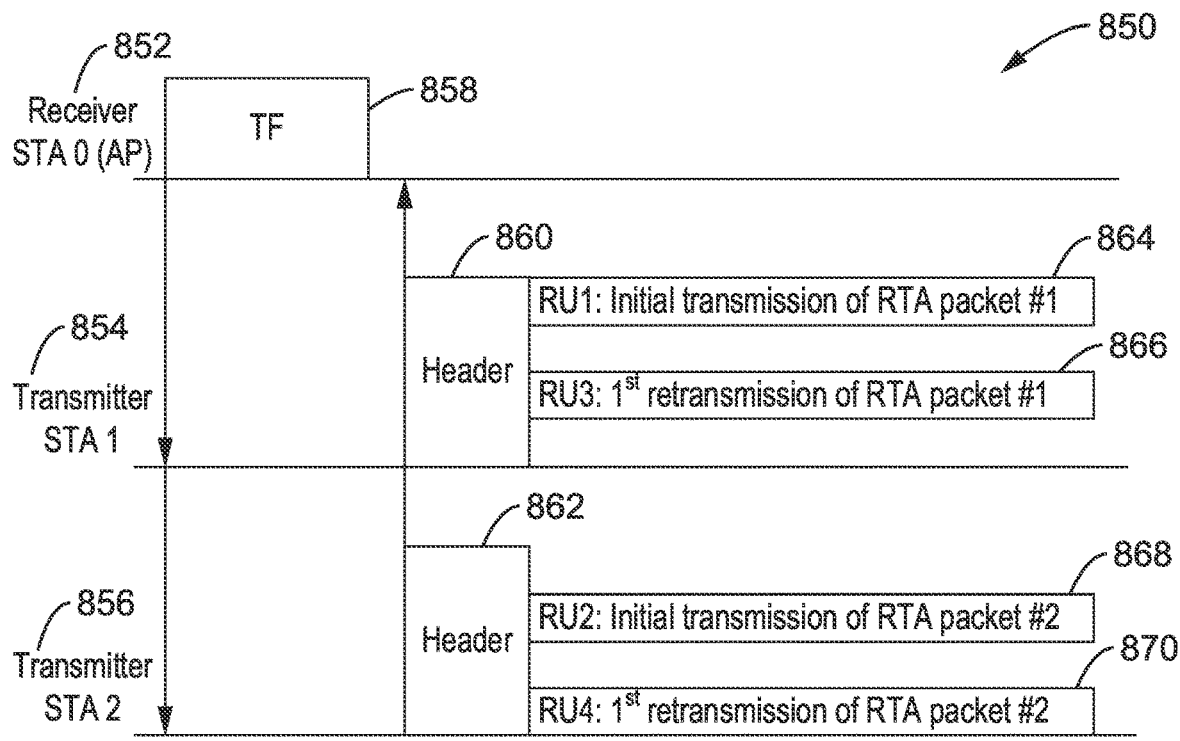

FIG. 36 is a communication sequence diagram as Example 10 of a STA transmitting an RTA packet with unsolicited retry on a single link according to at least one embodiment of the present disclosure.

Figure 37:
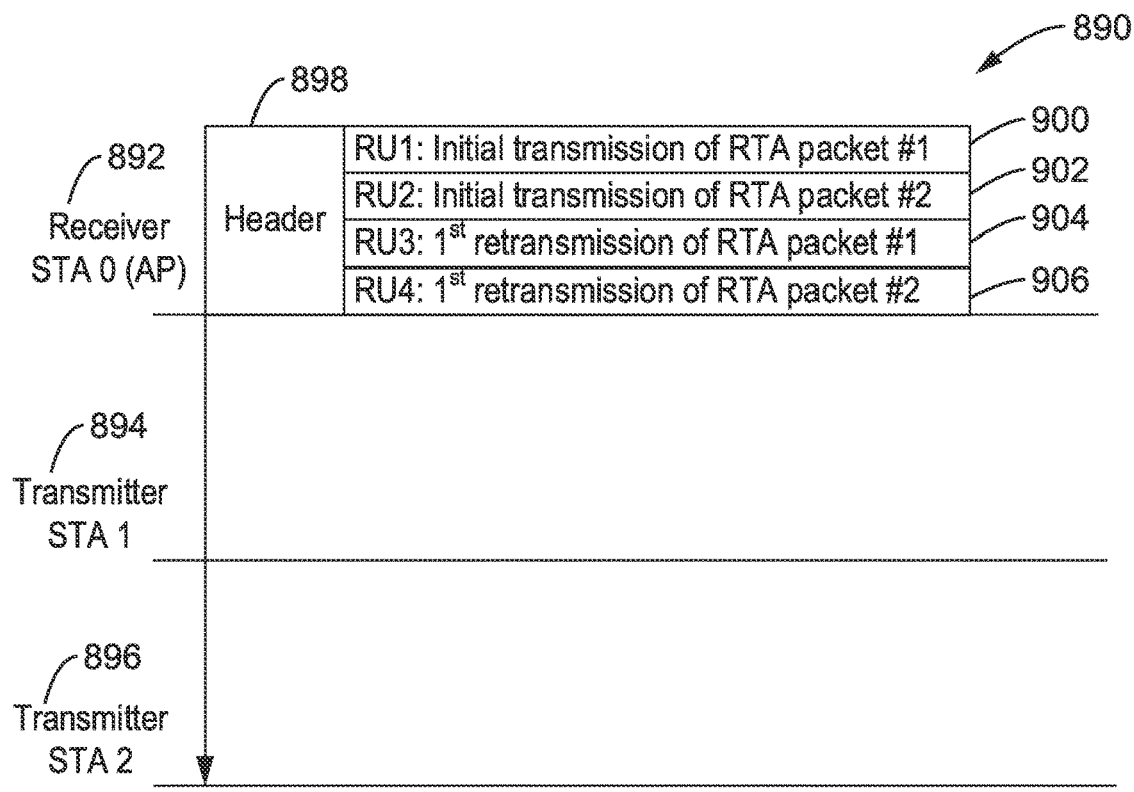

FIG. 37 is a communication sequence diagram as Example 11 of how STA transmitting an RTA packet with unsolicited retry on a single link according to at least one embodiment of the present disclosure.

Figure 38:
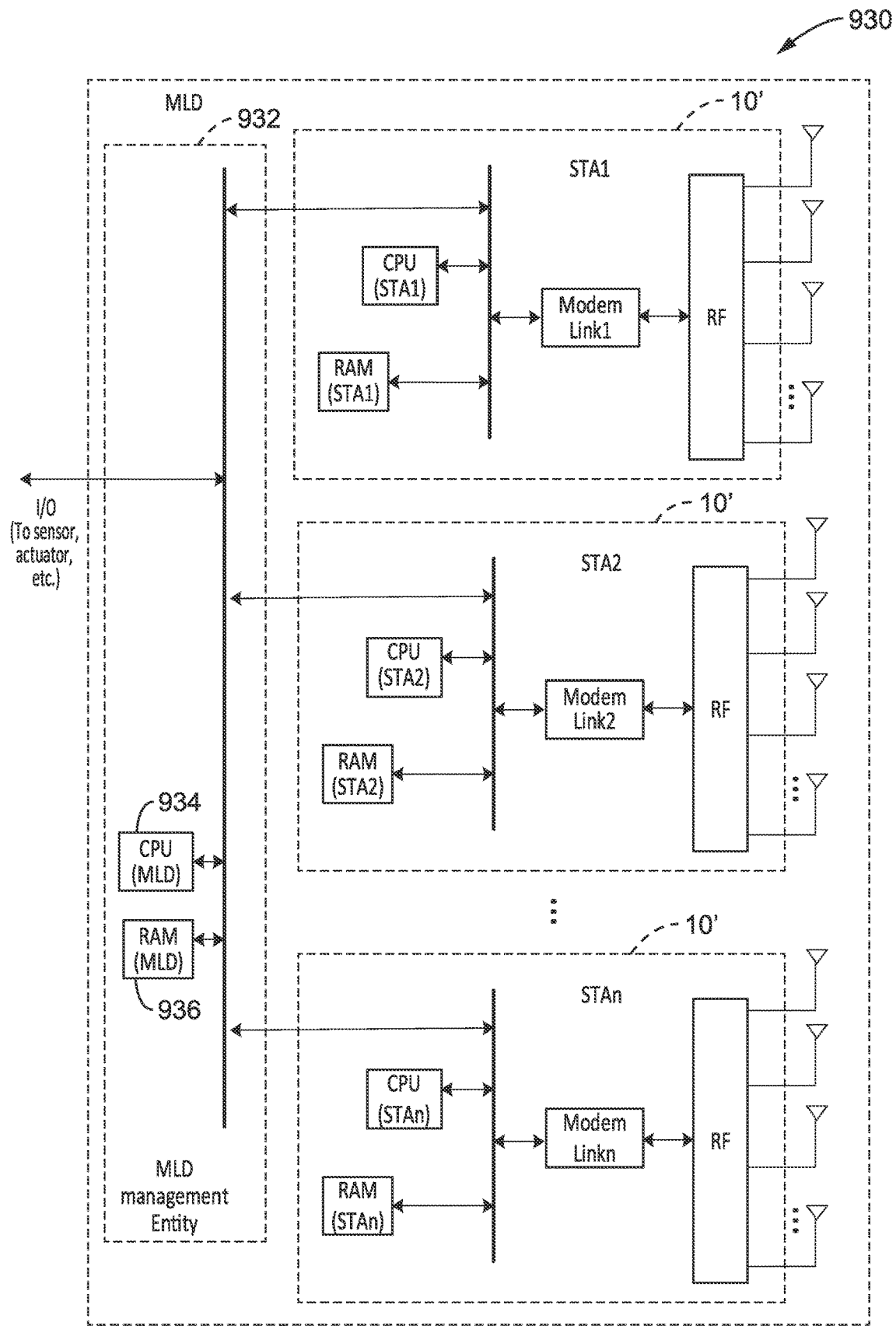

FIG. 38 is a hardware block diagram of wireless communication stations affiliated in a multi-link device (MLD) configuration according to at least one embodiment of the present disclosure.

DETAILED DESCRIPTION

1. Introduction to Relevant 802.11 Elements 1.1. TSPEC Element

FIG. 1 illustrates the contents in the Traffic Specification (TSPEC) element, which is defined in IEEE 802.11 as having the following fields. An Element ID field indicates the type of element. In this case it would indicate this is TSPEC element. A Length field indicates the length of the TSPEC element. A TS Information field contains the traffic stream information as described below for FIG. 2. A Nominal MAC Service Data Unit (MSDU) Size field indicates the nominal size of MSDUs or A-MSDUs belonging to the Traffic Stream (TS) under this TSPEC. A Maximum MSDU Size field indicates the maximum size of MSDUs or A-MSDUs belonging to the TS under this TSPEC. A Minimum Service Interval field indicates the minimum time between the start times of two successive service periods (SPs). A Maximum Service Interval field indicates the maximum time between the start times of two successive SPs. An Inactivity Interval field indicates the maximum amount of time to allow without arrival or transmission of a MSDU belonging to the TS before that TS is deleted. A Suspension Interval field contains the maximum amount of time without arrival or transmission of an MSDU belonging to the TS before the generation of successive Quality of Service (QoS): QoS(+)CF-Poll is stopped for this TS. A Service Start Time field indicates the start time of the first SP. A Minimum Data Rate field indicates the lowest data rate specified by MAC SAP for transmitting MSDUs or A-MSDUs belonging to the TS under this TSPEC. A Mean Data Rate field indicates the average data rate specified by Media Access Control (MAC) Service Access Point (SAP) for transmitting MSDUs or A-MSDUs belonging to the TS under this TSPEC. A Peak Data Rate value field indicates the maximum data rate specified by MAC SAP for transmitting MSDUs or A-MSDUs belonging to the TS under this TSPEC. A Burst Size field indicates the maximum burst of MSDUs or A-MSDUs belonging to the TS under this TSPEC at the peak data rate. A Delay Bound field indicates the maximum time that is allowed for transmitting an MSDU or A-MSDU belonging to the TS under this TSPEC. A Minimum PHY Rate field indicates the lowest PHY rate for transmitting MSDUs or A-MSDUs belonging to the TS through the PHYsical layer under this TSPEC. A Surplus Bandwidth Allowance field indicates the ratio of the bandwidth used for transmitting a MSDU or A-MSDU belonging to the TS under this TSPEC and its retransmissions to the bandwidth used for a transmitting that MSDU or A-MSDU once at the minimum PHY rate. A Medium Time field indicates the time designated for accessing the medium. A DMG Attributes field is presented when the TSPEC is applied to a directional multi-gigabit (DMG) BSS.

1.2. TS Info Element

FIG. 2 shows the content in the TS Information field which is one of the fields in the TSPEC element described in FIG. 1, as defined in IEEE 802.11, and having the following subfields. A Traffic Type subfield specifies whether the traffic is periodic or not. A TSID subfield indicates the ID number to identify the Traffic Stream (TS). A Direction subfield specifies the direction of data transmission. An Access Policy subfield specifies the method to use for gaining channel access. An Aggregation subfield specifies whether an aggregation schedule is required. An APSD subfield indicates whether the automatic Power Save (PS) delivery is used. A User Priority subfield indicates the user priority of the MSDU or A-MSDU belonging to the TS. A TSInfo Ack Policy subfield indicates whether the ACK is required and which form of ACK is to be used. A Schedule subfield indicates the type of schedule.

1.3. TCLAS Element

FIG. 3 shows the content in the TCLAS element which is defined in IEEE 802.11, having the following fields. An Element ID field indicates the type of the element, and is used in this case to indicate a TCLAS element. A Length field indicates the length of the TCLAS element. A User Priority field indicates user priority from the upper layer. A Frame Classifier field indicates the method to be used in classifying the frames from the upper layer.

1.4. TCLAS Process Element

Figures 4, 5:
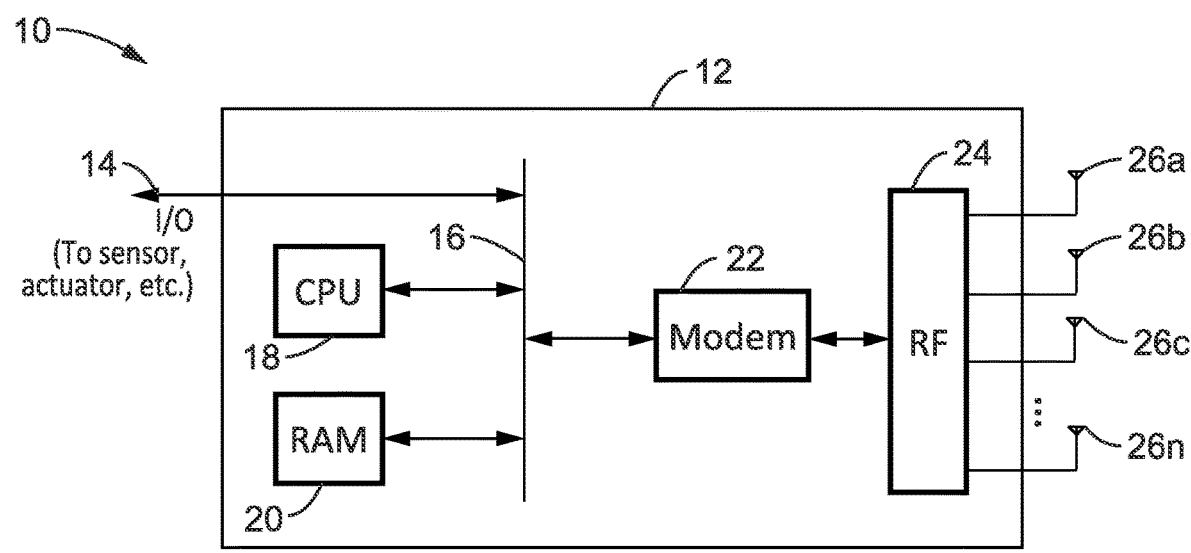
FIG. 4 is a data field diagram of a Traffic Classification (TCLAS) Process element field defined in IEEE 802.11.
FIG. 5 is a hardware block diagram of wireless station hardware according to at least one embodiment of the present disclosure.

FIG. 4 shows the contents of the TCLAS Processing element which is defined in IEEE 802.11 having the following fields. An Element ID field indicates the type of element; in this case a TCLAS Processing element. A Length field indicates the length of the TCLAS Processing element. A Processing field indicates the method of classifying the traffic from the upper layer when multiple TCLAS elements exist.

2. Problem Statement

At the time of the present disclosure wireless communication systems using CSMA/CA do not distinguish between RTA packets and non-RTA packets, and all the packets use the same retransmission scheme in CSMA/CA. The retransmission scheme in CSMA/CA aims to reduce the probability of packet collisions, while packet latency is not a primary concern. In these CSMA/CA systems each retransmission requires the STA to contend for the channel with increasingly longer contention windows, which adds significant delay on packet transmissions, and thus increases packet latency.

The retransmission scheme in CSMA/CA does not take packet timeliness into consideration. A transmitter STA retransmits the packet until either it is received by the receiver STA or it exceeds the retry limit. However, RTA packets have a lifetime within which they must be transmitted or be considered invalid. That is, the RTA packet has to be transmitted or retransmitted by a certain time.

3. Contributions of the Present Disclosure

One solution under CSMA/CA wireless technology is to allow STAs to obtain channel access more rapidly with less channel contention time. Due to the random channel access scenario, STAs need to sense and contend for channel access before transmitting each packet. Although the short channel contention time accelerates channel access, it increases the probability of packet collision. The delay caused by packet collisions is still significant due to the channel contention time for each retransmission.

To avoid packet collision and improve packet delivery success rates current WLAN systems handle packet collisions by having the STA retransmit the packet with a longer channel contention period after it receives the feedback of transmission failure, such as ACK Timeout or BA. However, this approach extends packet delays.

To eliminate the delay caused by current retransmission procedures, a beneficial unsolicited retry scheme is described herein, in which RTA packets can be retransmitted without waiting for any feedback. In the unsolicited retry scheme for RTA packets, a STA node duplicates the RTA packets in time and/or frequency domains. The duplications of an RTA packet are regarded as initial transmission and retransmissions of the RTA packets. They are transmitted during the same period of TXOP to achieve desired packet loss rates required by RTA traffic.

The task of applying an unsolicited retry scheme for RTA packets in CSMA/CA system is more challenging due to coexistence of the RTA traffic and non-RTA traffic. The challenge in this process can be summarized as: (a) identifying of RTA packet and non-RTA packet; (b) duplicating an RTA packet in time and/or frequency domains; (c) transmitting duplications of RTA packets during the same TXOP period.

Designing an unsolicited retry scheme for RTA packets according to the present disclosure aims to consider the time-validity of RTA traffic and minimize its latency in a wireless network where RTA and non-RTA traffic coexist.

By utilizing the present disclosure the importance of RTA packet latency is addressed, such as including the following contributions. STAs can discern RTA packets from non-RTA packets. The timeliness of RTA traffic is taken into consideration, as STAs schedule the retransmission of RTA packets based on the lifetime of the RTA packet. STAs separate the retransmission scheme for RTA packets from that of non-RTA packets, while non-RTA packets can still use the regular retransmission scheme defined in CSMA/CA. An unsolicited retry scheme is provided for RTA traffic to transmit and retransmit the RTA packets in the same TXOP period. STAs are allowed to obtain TXOP on multiple links to transmit the initial transmission of the RTA packets on one link and retransmit their retransmissions on the other links. The present disclosure is compatible with OFDMA systems. STAs are allowed to use one resource unit (RU) to transmit the initial transmission of an RTA packet and another RU to transmit its retransmissions in the same MU-PPDU packet. A STA is allowed to set up a Block Acknowledgement (BA) agreement for RTA packets to obtain packet loss information on multiple links to adapt packet transmission, such as Modulation Coding Scheme (MCS), unsolicited retry limit, and others without limitation.

4. Embodiments 4.1. Station Hardware and Example Network Topology

FIG. 5 illustrates an example embodiment 10 of a wireless communication circuit, one or more of which may be utilized in a station (STA). The station is shown having external I/O, CPU and Memory for executing a program that implements this communication protocol, and at least one modem and radio frequency (RF) circuit to transmit/receive data frames with neighboring STAs.

Specifically, a WLAN station according to the present disclosure is shown with I/O path 14 into station circuit block 12 which has a bus 16 connected to at least one computer processor (CPU) 18, memory (RAM) 20, and at least one modem 22. Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station, or a non-AP (regular) station (STA), or a Multi-Link Device (MLD) whether it's for an AP station or a non-AP station. It should also be appreciated that the programming is configured to operate in different modes (source, intermediate, destination, first AP, other AP, non-AP stations associated with the first AP, stations associated with other AP, coordinator, coordinatee and so forth), depending on what role it is playing in the current communication context.

This host machine is shown configured with at least one modem and RF circuit to generate and receive physical signals. By way of example and not limitation, a mmW modem 22 is coupled to at least one radio-frequency (RF) circuit 24 which connects to at least one antenna 26a, 26b, 26c through 26n (e.g., antenna array) to transmit and receive frames with neighboring STAs. The present disclosure can be utilized with stations which communicate directional signals, or omni-direction signals, or a combination of directional and omni-directional signals.

By way of example and not limitation, an array of antennas, such as seen 26a, 26b, 26c through 26n can allow a STA to transmit signals using multiple sets of beam patterns. The RF circuit generally includes a frequency converter, an array antenna controller, and other control and radio frequency circuits. The combination of processor, modem and RF circuits, allow beamformed (directional) communications to be supported, as well as for supporting quasi-omni (referred to herein simply as omni) mode transmissions from the antenna array. In addition, in at least one preferred embodiment, nulls can be generated in directional patterns created by the antenna array to shield select directions (sectors) and thus reduce interference between stations.

Thus, the STA HW is shown configured with at least one modem, and associated RF circuitry for providing communication on at least one band. By way of example and not limitation the intended directional communication band is implemented with a mmW band modem and its associated RF circuitries for transmitting and receiving data in the mmW band. In at least one other implementation at least a second band is supported in hardware, generally referred to as a discovery band, which by way of example and not limitation may comprise a sub-6 GHz modem and its associated RF circuitry for transmitting and receiving data in the sub-6 GHz band.

It should be appreciated that the present disclosure can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

FIG. 38 illustrates a variation of FIG. 5, as embodiment 930 in which wireless communication stations are affiliated in a multi-link device (MLD) hardware configuration. Each STA operates on a link of a different frequency. Each station 10' can be as that described in FIG. 5, with each having CPU, RAM, Modem, RF circuits and one or more antennas. It is seen in the figure that each of the n stations shown provide a different link (e.g., Link1, Link2 through Linkn are shown).

The MLD is also seen with circuitry 932 of an MLD management entity having at least one processor (CPU) 934, memory 936 which provides external I/O to access applications of the MLD and to implement communication protocols at the MLD level. The MLD is configured to distribute tasks to, and collect information from, each affiliated STA and share information between affiliated STAs.

It should also be appreciated that each STA of the MLD need not have its own processor and memory. In at least one embodiment one or more stations may share processors and memory, or the processor and memory of the MLD circuit. Thus the present disclosure contemplates many possible arrangements for communication over multiple links within an MLD.

Figure 6:
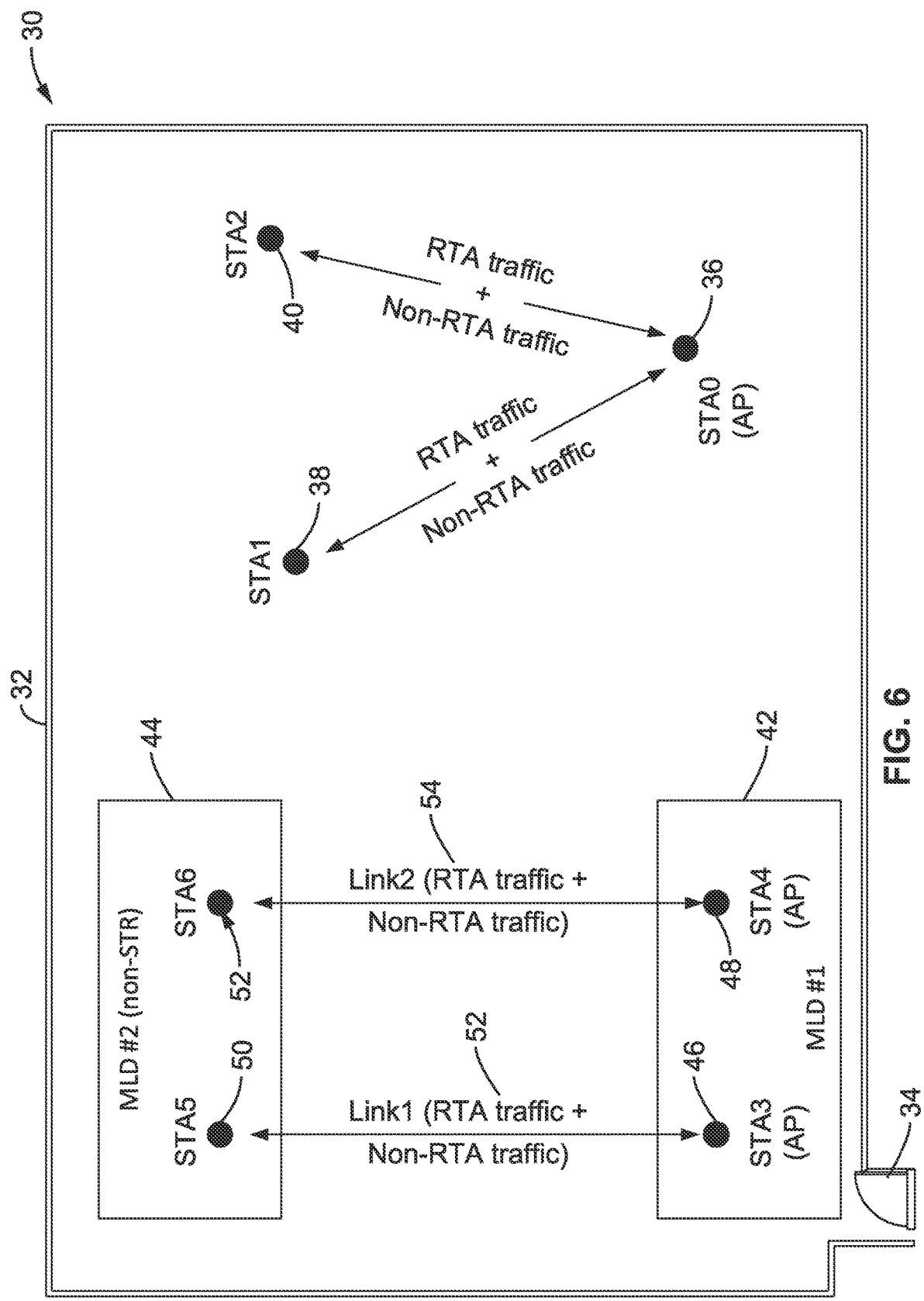
FIG. 6 is a network topology diagram shown by way of example and not limitation with Basic Service Sets (BSS)

FIG. 6 illustrates an example embodiment 30 of a topology which is utilized herein for illustration purposes, and not by way of limitation, as the present disclosure can support network scenarios with various numbers of stations and station arrangements without limitation. To simplify illustration the example describes seven STAs consisting of two BSSs in a surrounding enclosure (e.g., meeting room) 32, having any desired configuration and openings/apertures 34, furnishings and so forth. Each STA can communicate with the other STAs in the same BSS. All STAs use CSMA/CA for random channel access.

By way of example and not limitation, all STAs are considered to run both applications requiring low latency communication and applications that use best effort communication. The data generated from the application requiring low latency communication is called RTA traffic and will be packetized as RTA packets at the transmitter STA. Also, the data generated from the non-time sensitive application is called non-RTA traffic and will be packetized as non-RTA packets at the transmitter STA. As a consequence, the transmitter STA generates both RTA traffic and non-RTA traffic for communication. The location of the STAs and their transmission links are as shown in the figure.

A first BSS comprises STA0 (AP) 36, STA1 38 and STA2 40 and is only able to transmit packets over a single channel/band. A second BSS comprises STA3 (AP) 46 and STA4 (AP) 48, which are affiliated by AP multi-link device (MLD) #1 42 to STA5 50 and STA6 52 affiliated by non-AP MLD #2 44. An MLD includes one MAC data service which is shared by the affiliated STAs. STA 5 is associated with STA 3 over Link1 52 and STA 6 is associated with STA 4 over Link2 54. MLD #1 and MLD #2 can transmit and receive data through either Link1 or Link2.

If a MLD has a link pair such that the MLD is not able to transmit on one link of the link pair and receive on the other link of the link pair simultaneously due to in-device operation constraints, then this MLD is referred to as non-Simultaneous Transmit/Receive (non-STR) MLD. Otherwise, a MLD is referred to as a Simultaneous Transmit/Receive (STR) MLD.

4.2. Low Latency Transmission Service (LLTS) Setup

Often, RTAs generate traffic periodically, just as in connection-oriented communications. An RTA connection-oriented communication established by an application between STAs is called an RTA session. It is possible that a STA can have multiple RTA sessions in the network. A STA is able to manage those RTA sessions properly and applies the unsolicited retry policy to the RTA packets of an RTA session. An LLTS setup can be used for: (a) identifying RTA traffic of an RTA session from the upper layer; (b) setting the unsolicited retry configuration for RTA traffic of an RTA session; and (c) scheduling the unsolicited retry for RTA traffic of an RTA session to satisfy its Quality-of-Service (QoS) requirement.

FIG. 7 illustrates an example embodiment 70 of an LLTS setup communication shown between MAC Sublayer Management Entity (SME) 76 and MAC Sublayer Management Entity (MLME) 78 of a STA (e.g., non-AP STA) 72, and MLME 80 and SME 82 of another STA (e.g., an AP) 74. It will be appreciated that the interworking model of the STAs can utilize the same one as defined in the IEEE 802.11 standard.

The non-AP STA decides to initiate an LLTS setup procedure with the AP. The Station Management Entity (SME) of the non-AP STA sends a MLME-LLTS.request message 84 to its MAC Sublayer Management Entity (MLME). When the MLME of the non-AP STA receives the MLME-LLTS.request message, it collects the information in the MLME-LLTS.request message and sends a LLTS request frame 86 to the AP. The MLME of the AP receives the frame and generates a MLME-LLTS.indication message 88 to its SME.

Then, the SME of the AP processes 90 the message and sends an MLME-LLTS.response message 92 containing LLTS setup result to its MLME. Then, the MLME of the AP sends an LLTS response frame 94 to the non-AP STA. The MLME of the non-AP STA receives the frame and sends an MLME-LLTS.confirm message 96 to its SME. From this exchange, the non-AP STA knows (can determine) whether the LLTS setup was successful or not.

The above procedure can also be used to change or remove an LLTS. The lower portion of the figure shows an example of terminating an LLTS. The AP STA decides to terminate 98 a LLTS with the non-AP STA. The SME of the AP sends a MLME-LLTS-TERM.request message 100 to its MLME. When the MLME of the AP receives the MLME-LLTS-TERM.request message, it collects the information in the MLME-LLTS-TERM.request message and sends a LLTS response frame 102 to the non-AP STA. The MLME of the non-AP STA receives the frame and generates a MLME-LLTS-TERM.indication message 104 to its SME. Thus from this communication the non-AP knows (determines) that the LLTS is terminated.

The RTA traffic of an RTA session can be classified by an LLTS setup. The traffic from the upper layer is RTA traffic of an RTA session if the upper layer information of the traffic matches the information of the TCLAS element and the TCLAS Process element which are exchanged during the LLTS setup procedure.

The Quality-of-Service (QoS) requirements of the RTA traffic of an RTA session can be shared between AP and non-AP STAs by exchanging RTA-TSPEC elements during the LLTS setup procedure. The LLTS setup could also be used to check whether the AP and non-AP STAs have sufficient resources to support the RTA traffic transmission.

4.2.1. LLTS Request Frame

FIG. 8 illustrates an example embodiment 110 of the format for an LLTS Request frame having the following fields. A Frame Control field indicates the type of frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence control field indicates the sequence number of the frame. An HT control field indicates the extra control information for High-Throughput (HT) or Very-High-Throughput (VHT) frames. An Action field indicates the action to perform when it is the LLTS Request frame. A Frame Check Sequence (FCS) is seen here, and in other data formats described in the present disclosure, as it provides an error-detecting code added to a frame in a communications protocol.

The above Action field includes an LLTS Request element, which in at least one embodiment has the following subfields. An Element ID subfield indicates the type of element, which in this case indicates an LLTS Request element. A Length subfield indicates the length of the LLTS Request element. An LLTS Descriptor List subfield indicates the sequence of LLTS Descriptor fields, with each LLTS Descriptor field set to indicate a LLTS setup request for the traffic under certain specification and classification information. When this information is received the recipient STA can understand (recognize) the specification and classification information of the traffic and decide to accept or reject the LLTS setup request.

4.2.2. LLTS Descriptor Field

FIG. 9 illustrates an example embodiment 130 of an LLTS Descriptor having the following fields. An LLID field contains the identification of a low latency transmission service. For example, the non-AP STA sets a number to represent the LLTS. The AP receiving this number can utilize it to identify the LLTS which is set with the non-AP STA. An LL Length field indicates the length of the LLTS Descriptor field. A Request Type field is set to indicate the type of LLTS descriptor. When the non-AP STA sets the request type field to "Add", then the non-AP STA requests to add a new LLTS. The receiver AP should respond to this request whether the adding of a new LLTS is accepted by the AP or not. When the non-AP STA sets the request type field to "Change", then the non-AP STA requests to change the parameters of an existing LLTS. When the AP receives this field, it can find the LLTS using the LLID, and either accept the parameter changes to that LLTS, or reject the change. When non-AP STA sets the request type to "Remove", then the non-AP STA requests to remove an existing LLTS. When the AP receives this field, it can find the LLTS using the LLID and removes the LLTS.

A TCLAS field can be identical to TCLAS element defined in IEEE 802.11. The non-AP STA sets this field to indicate the information of the traffic from the upper layer. The AP uses this information to identify the RTA traffic under this LLTS arriving from the upper layer when the traffic is downlink and the upper layer information of the traffic matches the TCLAS information. The LLTS Descriptor field can contain multiple TCLAS fields.

A TCLAS Processing field can be identical to TCLAS Processing element defined in IEEE 802.11. The non-AP STA sets this field to indicate the rule of using multiple TCLAS fields to identify the RTA traffic when there exists multiple TCLAS fields in the LLTS Descriptor field. When the AP receives this field in the LLTS Descriptor field, it can determine how to use multiple TCLAS fields to identify the traffic from the upper layer.

An RTA-TSPEC field indicates the specification and the QoS requirement for the RTA traffic. When the AP receives this field, the AP can use the information in this field to decide whether to accept or reject the LLTS request. This field also contains information on traffic direction under this LLTS (e.g., uplink, downlink, or bidirectional) which could be set in the Direction field of the TS Info field of TSPEC element. The TSID field in the TS Info field of TSPEC element can be set to indicate the TID of the RTA traffic belonging to the LLTS under this RTA-TSPEC. The Access Policy field in TS Info field of TSPEC element can be set to indicate the access method, such as EDCA, HCCA, HEMM, and so on (as defined in IEEE 802.11), to be used for the LLTS under this RTA-TSPEC. The User Priority field in TSPEC could be used to indicate the user priority of the RTA traffic belonging to the LLTS. For example, STA1 could setup a LLTS with STA0. In the present example the LLID is set to "1", and the TSID is set to "8". The unsolicited retry for this RTA traffic should be scheduled to satisfy the QoS requirement.

An Optional Subelements field indicates the retransmission policy of the traffic under this LLTS. When an AP receives this field, it should respond to the non-AP STA whether or not it will provide the requested LLTS for the traffic.

4.2.3. RTA-TSPEC

FIG. 10 illustrates an example embodiment 150 of the RTA-TSPEC having the following fields. A TSPEC field can be identical to the TSPEC element defined in IEEE 802.11. The non-AP sets this field to indicate the specification and partial QoS requirement for the RTA traffic under this RTA-TSPEC. When the AP receives this field, it can use this information to estimate resource distribution for the transmission of the RTA traffic under this RTA-TSPEC. Based on the estimation, the AP can decide whether to accept the LLTS setup or not. An RTA Attributes field indicates the additional QoS requirement for RTA traffic under this RTA-TSPEC. A Reliability field indicates packet loss requirements of the RTA traffic under this RTA-TSPEC. When the AP receives this field, it should estimate the resource distribution for the transmission of the RTA traffic under this RTA-TSPEC to ensure that the packet loss of the RTA traffic under this RTA-TSPEC is less than the packet loss indicated in the Reliability field, especially when the unsolicited retry is enabled.

A jitter field indicates the jitter requirement of the delivery of the MSDUs or A-MSDUs belonging to the LLTS under this RTA-TSPEC. The non-AP sets this field to request the AP to guarantee that the maximum jitter limit of the MSDU or A-MSDU belonging to the LLTS under this RTA-TSPEC. AP receives this field and estimates whether this request can be satisfied or not. For example, the difference between Maximum service Interval and Minimum service Interval should be less than jitter to satisfy this request. The AP sets this field to indicate the jitter level it can support. When the non-AP receives this field, it either accepts the jitter provided by AP or renegotiates with the AP.

An MSDU Lifetime field indicates that the MSDU lifetime represents the time that the MSDU can be stored at the queue. The STA sets this field to indicate the MSDU lifetime of the RTA traffic under this RTA-TSPEC when the Deterministic Service field is set to a first state (e.g., "1"). When the STA receives this field and the Deterministic Service field is set to the first state (e.g., "1"), then the MSDU is dropped when the MSDU is not transmitted successfully within this MSDU lifetime. When the Deterministic Service field is set to a second state (e.g., "0"), then this field is reserved.

A Deterministic Service field is set by the STA to indicate whether the MSDU of the RTA traffic under this RTA-TSPEC will be dropped when its lifetime expires. If a STA sets this field to a first state (e.g., "1"), then the MSDU of the RTA traffic under this RTA-TSPEC will be dropped when its lifetime expires; otherwise the STA sets this field to a second state (e.g., "0"). When the STA receives this field which is set to a first state (e.g., "1"), then the MSDU of the RTA traffic under this RTA-TSPEC will be dropped when its lifetime expires. When the STA receives this field which is set to a second state (e.g., "0"), then there is no lifetime value for the MSDU of the RTA traffic under this RTA-TSPEC.

A Nominal Service Interval field indicates the nominal/average time between the start time of two successive SPs. It is possible that this field is only valid when the Traffic Type subfield in the LLTS Info is set to a first state (e.g., "1"). The Non-AP sets this field to request the AP to guarantee the service interval of the MSDU or A-MSDU belonging to the LLTS under this RTA-TSPEC. The AP receives this field and estimates whether this request can be satisfied or not. For example, the AP sets this field to indicate the Nominal service interval it can provide. When the non-AP receives this field, it either accepts the service interval provided by AP or renegotiates with AP.

4.2.4. Optional Subelement

FIG. 11 illustrates an example embodiment 170 of an Optional Subelement having the following fields. When a non-AP STA sets the following fields in LLTS request frame, then those fields represent the request of the non-AP STA to establish an LLTS. When the AP receives this request, it can decide (determine) whether it can accept the request. When a non-AP STA sets the following fields in the LLTS response frame to accept an LLTS setup, then those fields represent the setting of the LLTS. Both AP and non-AP STAs should follow the LLTS settings to execute the unsolicited retry for the RTA traffic under this LLTS.

A Subelement ID field indicates the type of subelement. The field here indicates it is an optional subelement under LLTS Request element. A Length field indicates the length of the optional subelement field. An LLTS Retransmission Policy field indicates the retransmission policy for the LLTS. The non-AP STA sets this field to request application of this retransmission policy for the RTA traffic under this LLTS. When the AP STA receives this field it decides whether to accept or reject the request. The AP STA sets this field to indicate the request of the retransmission policy it provides when the LLTS setup is accepted. When the non-AP STA receives this field, it can apply the retransmission policy given by the AP STA to the RTA traffic under this LLTS. When this field is set to "unsolicited retry", then the packets under this LLTS will be transmitted with unsolicited retry on single link if the LLTS setup is successful. When this field is set to "unsolicited retry with BA", then the packets under this LLTS will be transmitted with unsolicited retry on single links if the LLTS setup is successful. The transmitter of the packets may request block ACK feedback by sending a Block ACK Request (BAR) frame to the receiver.

An Unsolicited Retry Limit field is set to limit the number of the packet retransmissions under this LLTS when unsolicited retry is applied. The number of retransmissions of each packet under this LLTS should not exceed the unsolicited retry limit. If the number of the retransmissions of a packet under this LLTS exceeds the unsolicited retry limit, then that packet should be dropped.

An MAC Protocol Data Unit (MPDU) Lifetime field is set to indicate the lifetime of the MPDU under this LLTS. If the time since an MPDU arrives at the MAC layer is longer than the MPDU lifetime, then the lifetime of that MPDU expires and that MPDU should be dropped.

A Duplication in Time Allowance field can be implemented as a one-bit indication to indicate whether packet duplication in the time domain is allowed. When this field is set to a first state (e.g., "1"), then the packet under this LLTS is able to be retransmitted after its previous transmission attempt within the same TXOP or different TXOPs on a single link. No feedback is needed between those two transmission attempts. When this field is set to a second state (e.g., "0"), then the packet duplication in time is not allowed.

A Duplication in ML Allowance field can be implemented as a one-bit indication to indicate whether the packet duplication over multiple links is allowed. When this field is set to a first state (e.g., "1"), then the packet under this LLTS is able to be transmitted on one link and retransmitted on another link. No feedback is needed between the two transmission attempts. When this field is set to a second state (e.g., "0"), then the packet transmission and its retransmissions are only allowed to be transmitted over one link.

A Maximum Number of Links field is set to indicate the maximum number of links that can be used for the unsolicited retry. When this field is set, the number of links which consist of a combination listed in the Allowed Combinations of Links field cannot exceed the Maximum Number of Links. This field is reserved when the Duplication in ML Allowance field is set to the second state (e.g., "0").

An Allowed Combinations of Links field is set to indicate the possible combinations of multiple links that could be used for unsolicited retry. A STA can pick one of the combinations to transmit the packet and its unsolicited retries over the links in the combination. It should be appreciated that the number of links in each combination cannot exceed the maximum number of links. This field is reserved when the Duplication in ML Allowance field is set to a second state (e.g., "0").

A Duplication in RU Allowance field can provide an indication (e.g., one-bit indication) to indicate whether the duplicated packets are allowed to be transmitted over multiple RUs in one MU PPDU/TB PPDU packet. "TB" indicates that the PPDU is Trigger Based. When the indication (bit) is set to a first state (e.g., "1"), then the STA can use one RU to transmit the packet and use the other RUs to transmit its duplications. Otherwise, if the indication (bit) is set to a second state (e.g., "0") then the packet duplication in RU is not allowed.

A Maximum number of RUs field is set to indicate the maximum number of RUs of a MU PPDU/TB PPDU packet that can be used for the unsolicited retry. When this field is set, the number of RUs in one MU PPDU or TB PPDU packet listed in the Allowed combinations of RUs field cannot exceed the Maximum number of RUs. This field is reserved when the Duplication in RU Allowance field is set to a second state (e.g., "0").

An Allowed Combinations of RUs field is set to indicate the possible combinations of multiple RUs in one MU PPDU/TB PPDU packet that could be used for unsolicited retry. A STA can pick one of these combination to transmit the packet and its unsolicited retries over the RUs in the combination. It should be appreciated that the number of RUs in each combination cannot exceed the maximum number of RUs. This field is reserved when the Duplication in ML Allowance field is set to a second state (e.g., "0"). It will be noted that for each combination, it may also indicate which link this combination is applied to.

4.2.5. LLTS Response Frame

FIG. 12 illustrates an example embodiment 190 of an LLTS Response frame having the following fields. A Frame Control field indicates the type of the frame. A Duration field contains NAV information used for CSMA/CA channel access. An Address 1 field contains an address for the recipient of the frame. An Address 2 field contains the address of the STA that transmitted the frame. An Address 3 field contains the BSSID. A Sequence Control field indicates the sequence number of the frame. An HT control field indicates the extra control information for HT or VHT frames. An Action field indicates the action to perform when it is the LLTS Response frame.

The fields in the Action field include an LLTS Response element, having the following subfields. An Element ID subfield indicates the type of the element, which in this case indicates it is an LLTS Response element.

A Length subfield indicates the length of the LLTS Response element. An LLTS Status List subfield indicates a sequence for the LLTS Status fields. Each LLTS Status field is set to indicate the a LLTS setup response for the traffic under certain specification and classification information. When this information is received, the receiver STA can determine the results of the LLTS setup for the RTA traffic or the change of the existing LLTS.

4.2.6. LLTS Status Field

FIG. 13 illustrates an example embodiment 210 of an LLTS Status frame having the following fields. An LLID field contains the identification of a low latency transmission service. An LL Length field indicates the length of the LLTS Descriptor field. A Response Type field is set to indicate the type of LLTS setup result. When the AP sets the response type field to "Accept", then the AP accepts the LLTS setup request from the non-AP STA. The non-AP STA receives this field and can determine that the LLTS setup was successful. When the AP sets the response type field to "Denied", then the AP rejects the LLTS setup request from the non-AP STA. When the non-AP STA receives this field, it may decide to attempt to initiate another LLTS setup with AP. When the AP sets the response type to "Terminate", then the AP terminates an existing LLTS with the non-AP STA. When the non-AP STA receives this field, it knows (determines) that the LLTS with the corresponding LLID is terminated and that the LLTS should be removed.

A TCLAS field can be identical to TCLAS element defined in IEEE 802.11. The AP sets this field to indicate the information of the traffic from the upper layer. When the non-AP STA receives this field, it can use this information to identify the traffic under this TTLS arriving from the upper layer when the traffic is an uplink. The LLTS Status field can contain multiple TCLAS fields. A TCLAS Processing field can be identical to the TCLAS Processing element defined in IEEE 802.11. The AP sets this field to indicate the rule of using multiple TCLAS fields to identify the RTA traffic when there exists multiple TCLAS fields in the LLTS Status field. When the non-AP STA receives this field in the LLTS Status field, it can determine how to use multiple TCLAS fields to identify the traffic from the upper layer.

An RTA-TSPEC field is identical to RTA-TSPEC element defined in FIG. 9. The AP sets this field to indicate the specification and QoS requirements of the RTA traffic. When the non-AP STA receives this field, it can know (recognize) under which RTA-TSPEC the AP decided to accept or reject the LLTS request. This field also contains the information of the RTA traffic direction under this LLTS (e.g., uplink, downlink, or bidirectional).

An Optional Subelements field is set by the AP to indicate the retransmission policy of the traffic under this LLTS. When a non-AP STA receives this field, it knows (determines) that the retransmission policy provided by AP when the response type field is set to "Accept".

Tables 1 through 6 provide information about the above messages. In particular Table 1 outlines the MLME-LLTS-.request, Table 2 outlines the MLME-LLTS.indication, Table 3 outlines the MLME-LLTS.response, Table 4 outlines MLME-LLTS.confirm, Table 5 outlines the MLME-LLTS-TERM.request, and Table 6 outlines the MLME-LLTS-TERM.indication.

FIG. 14 illustrates an example embodiment 230 of a STA deciding to apply the unsolicited retry policy to an RTA packet. When the STA has a packet to transmit 232, it checks 234 whether this packet belongs to an existing LLTS with the unsolicited retry policy applied. If this packet belongs to an existing LLTS, then execution moves to block 238 and the STA applies the unsolicited retry policy to the packet. Otherwise, if the packet does not belong to an existing LLTS, then the STA uses the regular retransmission policy 236 in CSMA/CA for the packet.

FIG. 15 illustrates an example embodiment 250 of a STA transmitting an RTA packets with unsolicited retry when the packet duplication in the time domain is allowed. When the STA is to transmit an RTA packet with unsolicited retry and the packet duplication in the time domain is allowed, that station contends for the channel, gains channel access and obtains the TXOP on a link 252. A check is then made 254 if the lifetime of the RTA packet has expired or the retry count exceeded the retry threshold. If either condition is met, then the RTA packet is dropped 260. Otherwise, if neither condition was met execution moves to block 256 and the STA makes one transmission attempt for the packet without waiting for feedback. After the STA finishes its transmission attempt of the RTA packet, a check 258 is made if the current TXOP has ended. If it has not ended, then execution returns to block 254 for another transmission attempt of the RTA packet in the next TXOP. Otherwise, execution moves to block 252 for the STA to again contend for the channel.

FIG. 16 illustrates an example embodiment 270 of an MLD obtaining TXOP for RTA packets with unsolicited retry in a multi-link scenario. When MLD has RTA packets to transmit with unsolicited retry, it contends 272 for the channel on multiple links simultaneously. A check is made 274 if all the links have gained channel access simultaneously. If the condition is true, then the MLD reserves 276 the same duration of TXOP on both links and the MLD transmits initial transmission of the packets on Link1 and their retransmissions on Link2. It should also be appreciated that the MLD can transmit another retransmission of the same packets on Link1 as they are retransmitted on Link2, instead of the initial transmission of those packets.

Otherwise, if the links to gain channel access were not simultaneous, then execution reaches block 278 with the MLD gaining channel access on one link (denoted by Link1) first, and it transmits 280 the initial transmission (it could also be a retransmission) of the packets on Link1. A check 282 is made to determine if the MLD obtains the channel access on another link (e.g., Link2) before the end of TXOP on Link1. If this condition is met, then MLD reserves 286 the TXOP on Link2 until the end of the TXOP reserved on Link1, after which the MLD transmits the retransmission (unsolicited retry) of the packets 288 on Link2 during the TXOP to end the process. Otherwise, if at check 282 it was found that the MLD did not obtain channel access on another link (e.g., Link2) before the end of TXOP on Link1, then the MLD fails 284 to obtain the TXOP on Link2 and no unsolicited retry occurs on Link2 with the process ending.

It should be appreciated that the MLD could decide to drop the packets that are transmitted during the current TXOP after the end of the current TXOP. MLD could also decide to retransmit those packets in the next TXOP if their lifetime does not expire and their retry count does not exceed the unsolicited retry limit.

It should also be noted that the MLD could obtain TXOP on more than two links for the unsolicited retry. The link which obtains the TXOP first is regarded as Link1 and the other links follow the rule of Link2 as explained in the flowchart. The combination of links could be chosen from the Allowed Combinations of Links field in LLTS setup.

It should be further noted that the method of obtaining TXOP as shown in the figure can also be utilized for transmitting non-RTA packets.

4.3. Fairness Between STR AP MLD and Non-STR Non-AP MLD

The alignment of the ending times of the TXOPs obtained on multiple links as explained in the flowchart in FIG. 16 aims to solve the fairness issue between STR AP MLD and non-STR non-AP MLD.

If the end time of the TXOPs is not aligned, then the following issue occurs. Let us assume that an STR AP MLD obtains the first TXOP on Link1 first. If it gains channel access on another link, e.g., Link2, before the end time of the TXOP of Link1, but reserves the TXOP whose end time is later than the end time of first TXOP of Link1, then the non-STR non-AP MLD is not able to access the channel until the end time of TXOP of Link2. However, during the time between the end time of TXOPs of Link1 and Link2, the AP MLD is still able to gain channel access on Link1. Then if the AP gains channel access and reserves another TXOP on Link1 whose end time is later than the TXOP of Link2, then the non-STR non-AP MLD is not able to access the channel until the end time of the second TXOP of Link1 and so on. Thus, in the worse case, the STR AP MLD would always occupy the multi-link and the non-STR non-AP MLD would have no chance to access the channel at all.

FIG. 17A and FIG. 17B illustrates an example embodiment 290 for an STR AP MLD obtaining TXOP on multi-link to transmit to non-STR non-AP MLD indicating a way of solving the fairness issue between STR AP MLD and non-STR non-AP MLD as described above. When STR AP MLD has packet(s) 292 to transmit to non-STR non-AP MLD, it generates a random value 294 and sets it as the number of backoff slots. It will be noted that each "slot" connotes a time increment, such as 20 microseconds. Then, each STA of the AP MLD starts to count down 296 the backoff on its own link independently.

At block 298 a check is made to determine if all the STAs of the AP MLD gain channel access simultaneously. If the condition is true, then the STAs of the AP MLD reserve 300 the same TXOP duration on all links to end the process.

Otherwise, if one STA of the AP MLD counts down the backoff to zero, then that STA gains 302 channel access on its link and execution moves to block 304 in FIG. 17B. It should be appreciated that due to different CCA busy time on each link, the STAs of the AP MLD may gain channel access at different times.

So at this point one STA of the AP MLD, denoted by STA1, has gained channel access earlier than other STAs, and has reserved the TXOP on its link, denoted by Link1. A check is made 304 to determine if the other STA of the AP MLD, denoted by STA2, has gained channel access on its link, denoted by Link2 before the end of TXOP on Link1. If the condition is met, then STA2 is able to reserve 308 the TXOP on Link2 until the end time of TXOP reserved on Link1. Otherwise, STA2 fails 306 to obtain the TXOP on Link2 and its backoff will be reset.

It should be noted that if all the STAs of the AP MLD gained channel access at the same time, then they reserved the same TXOP duration on all links. All the STAs of the AP MLD reset the backoff after the TXOP ends. The AP MLD sets the same backoff slots on multiple links to increase the chance of gaining channel access on multiple links simultaneously. It is possible that the AP MLD sets different backoff slots on multiple links.

It should also be noted that the method of obtaining TXOP as shown in the figure can also be used for transmitting either RTA packets or non-RTA packets.

FIG. 18 illustrates an example embodiment 310 for transmitting an RTA packet when unsolicited retries on multi-RU is allowed. The AP contends for channel access and gains the channel 312 for an RTA packet when unsolicited retry on multi-RU is allowed. A check 314 determines if the transmission is an uplink (UL). If this is an uplink, then at block 316 the AP embeds the RU distribution for the unsolicited retry in the trigger frame (TF) and transmits it to STA. The STA uses the RUs distributed by TF to transmit 320 the initial transmission (it could also be a retransmission) and retransmission of the RTA packet in the TB PPDU packet and the process ends.

Otherwise, if the transmission is not for a UL, then execution moves from block 314 to 318 and the AP distributes multiple RUs of the MU PPDU packet to transmit the initial transmission (it could also be a retransmission) and retransmissions of the RTA packet before the process ends.

It should be appreciated that the TB PPDU or the MU PPDU can only carry the retransmissions of the packet if the initial transmission of the RTA packet has been transmitted in the previous PPDU.

FIG. 19 illustrates an example embodiment 330 for a STA dropping an RTA packet which was allowed unsolicited retry. A Check is made 332 to determine if the number of packet retransmissions has reached the unsolicited retry limit or the lifetime of the packet has expired. If either condition is met then the packet is dropped 334. Otherwise, execution moves from block 332 to block 336 and the STA is able to retransmit the packet without receiving any feedback in the current TXOP.

FIG. 20 illustrates a first example embodiment 350 of an STA transmitting an RTA packet with unsolicited retry on a single link. This example can arise when the LLTS Retransmission Policy is set to "unsolicited retry" and the packet duplication in the time domain is allowed. The network topology of this example is shown in FIG. 6.

Transmitter STA1 352 is to transmit an RTA packet to Receiver STA0 (AP) 354. The unsolicited retry is allowed for transmitting the RTA packet which has arrived 356 in the queue. Transmitter STA1 contends 358 for the channel after RTA packet arrives in the queue and obtains the TXOP duration 360. During the TXOP duration, STA1 is able to transmit the RTA packet 362 with two unsolicited retransmissions 366, 370. The time between two packet transmissions could be an interframe spacing 364, 368, which is depicted as xIFS, however, SIFS or PIFS or other spacing may be utilized without departing from the teachings of the present disclosure. It should be appreciated that the transmissions from STA1 were performed without the need of Receiver STA0 transmitting any feedback to STA1. STA1 stops retransmitting the RTA packet when the packet reaches the unsolicited retry limit 372.

FIG. 21 illustrates an example embodiment 390 as Example 2 of a STA transmitting multiple RTA packets with unsolicited retry on a single link. This example arises when the LLTS Retransmission Policy is set to "unsolicited retry" and the duplication in time is allowed. The network topology of this example is shown in FIG. 5.

Transmitter STA1 352 is has two RTA packets to transmit, depicted as RTA packet #1 and RTA packet #2, to Receiver STA0 (AP) 354. The unsolicited retry is allowed for transmitting the two RTA packets. The RTA packet arrives 356 in the queue and transmitter STA1 contends 358 for the channel and after backoff obtains the TXOP duration 360. In this example, STA1 first transmits the initial transmissions of all the packets 392 and 396. Then it commences a first retransmission of all the packets 400, 406, after which is shown starting a second retransmission 410 of RTA packet #2.

During the TXOP duration, STA1 is able to transmit the RTA packets with unsolicited retransmissions. The time between the initial transmissions of the two packets could be an interframe spacing, depicted herein as xIFS 394, 404, although other spacing, such as SIFS or PIFS can be used without limitation.

Transmitter STA1 may wait another backoff time 398, 408 for the new retransmissions of RTA packet #1 and RTA packet #2. For example, transmitter STA1 invokes backoff 398 for the first retransmission of RTA packet #1 and #2. It also invokes backoff 408 for the second retransmission of RTA packet #2. The time between the retransmissions of the two packets with the same retry count could also be an xIFS, or other interframe spacing.

However, transmitter STA1 stops retransmission 402 of RTA packet #1 because the lifetime of that RTA packet has expired. Transmitter STA1 also is seen stopping 412 retransmission of RTA packet #2 because the number of the retransmission of that RTA packet reached the unsolicited retry limit. It will be seen in the figure that receiver STA0 354 did not need to transmit any feedback to STA1 during this process.

FIG. 22 illustrates an example embodiment 430 as Example 2-1 of a STA transmitting multiple RTA packets with unsolicited retry on a single link. This example arises when the LLTS Retransmission Policy is set to "unsolicited retry" and the packet duplication in the time domain is allowed. The network topology of this example is shown in FIG. 5.

Transmitter STA1 352 is to transmit two RTA packets, exemplified as RTA packet #1 and RTA packet #2, to Receiver STA0 (AP) 354, and the unsolicited retry is allowed for transmitting two RTA packets. An RTA packet arrives 356 in the queue. Transmitter STA1 contends 358 for the channel after the RTA packet arrives in the queue and obtains the TXOP duration 360. In this example, STA1 first transmits one packet (i.e., RTA packet #1) 432 with its unsolicited retries 436. Then it transmits the second packet (i.e., RTA packet #2) 442 with its unsolicited retries 446, 450, and so forth. The retransmissions of RTA packet #2 are also seen with possible backoffs 444 and 448.

During the TXOP duration STA1 is able to transmit the RTA packets with two unsolicited retransmissions. Transmitter STA1 may wait another backoff time 434, 440, 444 and 448 for the new transmission or retransmission of RTA packet.

Transmitter STA1 stops retransmission 440 of RTA packet #1 because the lifetime of that RTA packet expires. Transmitter STA1 stops retransmission 452 of RTA packet #2 because the number of the retransmissions of that RTA packet has reached the unsolicited retry limit. Receiver STA0 354 does not need to transmit any feedback to STA1.

FIG. 23 illustrates an example embodiment 470 as Example 3 of a STA transmitting an RTA packet with unsolicited retry on a single link when the BA is enabled. This example arises when the LLTS Retransmission Policy is set to "unsolicited retry with BA" and the packet duplication in the time domain is allowed. The network topology of this example is shown in FIG. 6.

Transmitter STA1 352 is to transmit an RTA packet to Receiver STA0 (AP) 354. The unsolicited retry is allowed for transmitting the RTA packet. Transmitter STA1 contends 358 for the channel after RTA packet arrives 356 in the queue and obtains the TXOP duration 360. During TXOP duration 360, STA1 is able to transmit the RTA packet 472 with two unsolicited retransmissions 476 and 480. The time between two packet transmissions could be an interframe spacing as such an xIFS 474, 478 and 482 as shown in the figure, or other spacing 486 (e.g., SIFS or PIFS, etc.). Receiver STA0 354 does not need to transmit any feedback to STA1. STA1 may stop retransmitting the RTA packet when the packet reaches the unsolicited retry limit.

After STA1 finishes retransmitting the RTA packet, it can transmit a BAR frame 484 to STA0 to request an BA feedback. Then STA0 receives the BAR and sends a BA 488 back to indicate the packet loss of the current packet.

The BA in this example may be not transmitted for retransmissions but for adaptations, such as rate adaptation and unsolicited retry limit adjustment, for use in future RTA packet transmissions.

FIG. 24 illustrates an example embodiment 490 as Example 4 of a STA transmitting an RTA packet with unsolicited retry on a single link when the BA is enabled. This example arises when the LLTS Retransmission Policy is set to "unsolicited retry with BA" and the packet duplication in the time domain is allowed. The network topology of this example is shown in FIG. 6.

Transmitter STA1 352 is to transmit four RTA packets, exemplified here as RTA packet #1 492, RTA packet #2 496, RTA packet #3 512 and RTA packet #4 516, to Receiver STA0 (AP) 354. The unsolicited retry is allowed for transmitting the RTA packets.

RTA packets arrive 356 in the queue then transmitter STA1 contends 358 for the channel and obtains the TXOP duration 360. In this example, STA1 first transmits the initial transmissions 492, 496 of RTA packets #1 and #2. Then it transmits the first retransmissions 500, 504 for RTA packets #1 and #2.

In the lower portion of the figure STA1 is seen obtaining the TXOP a second time for RTA packets #3 and #4. RTA packet(s) arrives 506 in the queue then transmitter STA1 contends 508 for the channel and obtains the TXOP duration 510. STA1 then transmits initial transmissions of RTA packet #3 512, and RTA packet #4 516, and then first retransmissions of RTA packet #3 520, and RTA packet #4 524.

During the TXOP duration, STA1 is able to transmit the RTA packets with unsolicited retransmissions. The time between two consecutive transmissions 494, 498, 502, 514, 518, 522, 526, 530 may comprise an interframe spacing, such as xIFS, SIFS, PIFS, or other interframe spacing mechanism.

In this example, it has been shown that STA1 obtains the TXOP twice. During the first TXOP, RTA packet #1 and RTA packet #2 are transmitted. During the second TXOP, RTA packet #3 and RTA packet #4 are transmitted. After STA1 finishes retransmitting RTA packet #4, it transmits a Block Acknowledge Request (BAR) frame 528 to STA0 to request BA feedback. STA0 receives the BAR and responds by sending a BA 532 back to indicate the packet loss of the current packet as well as previous RTA packets (i.e., RTA packets #1, #2, #3 and #4) which have been received.

The BA in this example may be not transmitted for retransmissions but for adaptations, such as rate adaptation and unsolicited retry limit adjustment, of the RTA packet transmissions in the future.

FIG. 25 illustrates an example embodiment 550 as Example 5 of a STA transmitting an RTA packet with unsolicited retry on a single link when the BA is enabled. This example scenario arises when the LLTS Retransmission Policy is set to "unsolicited retry with BA" and the packet duplication in the time domain is allowed. The network topology of this example is shown in FIG. 6.

Transmitter STA1 352 is to transmit an RTA packet (RTA packet #1) to Receiver STA0 (AP) 354. The unsolicited retry is allowed for transmitting the RTA packet. An RTA packet 356 arrives in the queue and transmitter STA1 contends 358 for the channel and obtains TXOP duration 360. During the TXOP STA1 is able to transmit 552 RTA packet #1 with unsolicited retransmissions. The time between two packet transmissions can include a backoff time 554, after which is seen STA1 performing a first retransmission 556 of RTA packet #1. At which time the number of retransmissions has reached 558 the unsolicited retry limit.

After STA1 finishes retransmitting the RTA packet, it transmits a BAR frame 562 to STA0 to request BA feedback. STA0 receives the BAR and sends a BA 566 back to indicate packet loss information for the current packet. The time between the end of the first retransmission of RTA packet #1 and BAR frame, and between BAR and BA response, may be an interframe spacing 560 and 564, such as xIFS, SIFS, PIFS, or other spacing mechanism.

The BA in this example may not be transmitted for the purpose of retransmissions but for adaptations, such as rate adaptation and unsolicited retry limit adjustment, to aid future RTA packet transmissions.

FIG. 26 illustrates an example embodiment 570 as Example 6 of a STA transmitting an RTA packet with unsolicited retry on multiple links. This example scenario arises when the LLTS Retransmission Policy is set to "unsolicited retry" and packet duplication on multi-links is allowed. The network topology of this example is shown in FIG. 6.

Transmitter MLD 1 571 is to transmit several RTA packets to Receiver MLD 2 (AP) (not shown) over multiple links. STA3 (AP) 572 of MLD1 transmits packets to STA5 (not shown) of MLD2 over Link1 and STA4 (AP) 574 of MLD1 transmits packets to STA6 (not shown) over Link2. The unsolicited retry is allowed for transmitting the RTA packets over multiple links. RTA packets arrive 576 and STA3 and STA4 start to contend 578, 580 for the channel on Link1 and Link2 at the same time.

During the TXOP on Link1 STA3 obtains TXOP duration 582 on Link1 first, and transmits initial transmissions of its RTA packets depicted as sending 586 RTA packet #1, sending 590 RTA packet #2, sending 594 RTA packet #3 and sending 598 RTA packet #4. The time between two packet transmissions may be an interframe spacing xIFS, SIFS, PIFS, or similar.

STA4 obtains TXOP duration 584 on Link2 before the end of TXOP on Link1 and reserves it. During TXOP on Link2, STA4 transmits the retransmissions of the RTA packets whose initial transmissions were transmitted during TXOP on Link1. Specifically, STA4 sends first retransmissions 588, 592 and 596.

The time between two packet transmissions can be an interframe spacing, such as xIFS, SIFS, PIFS, or other spacing mechanism as in the other examples of the present disclosure.

It should be appreciated that STA4 may not be able to retransmit all the RTA packets if the TXOP duration on Link2 is of insufficient length. For example, as shown in this example, the first retransmission of RTA packet #4 is not retransmitted over Link2 since it cannot be transmitted within the TXOP. RTA Packet #4 could be dropped after the end of the TXOP even if its lifetime is not expired. It will be noted that MLD2 does not need to transmit any feedback to indicate the success of the RTA packet transmissions. It should also be noted that the number of backoff slots on the two links can be the same. STA3 and STA 4 gain the channel at different times due to CCA busy time during counting down the backoff.

FIG. 27 illustrates an example embodiment 610 as Example 6-1 of a STA transmitting an RTA packet with unsolicited retry on multiple links. This example scenario arises when the LLTS Retransmission Policy is set to "unsolicited retry" and the duplication on multi-link is allowed, and as in the other examples is using the network topology as was shown in FIG. 6.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting the RTA packets over multiple links.

RTA packets arrive 576 and STA3 and STA4 start to contend 578, 580 for the channel on Link1 and Link2 at the same time. STA3 obtains the channel access and reserves TXOP duration 582 on Link1 first. Then, STA1 is able to transmit the initial transmissions of the RTA packets during the TXOP on Link1. More specifically in this example STA3 sends 612, 616, 620 and 624 the RTA packets #1, #2, #3 and #4.

As in the other examples, the time between two packet transmissions can be an interframe spacing, such as xIFS, or other spacing mechanism. According to the time of STA4 obtaining the TXOP, the duration of xIFS can be adjusted in order to align 628 the end of the last PPDUs transmitted in the TXOP on both links. For example, as shown in the figure, the end of the initial transmission of RTA packet #4 and the end of the first retransmission 626 of RTA packet #4 are aligned. Since the transmissions of RTA packets #1 through #4 on the two links are known, the duration of xIFS can be calculated when STA4 gains channel access on Link2. It is possible that the xIFS is longer than SIFS but shorter than PIFS.

STA4 obtains TXOP duration 584 on Link2 and reserves it before the end of TXOP on Link1. During the TXOP on Link2, STA4 transmits the retransmissions 614, 618, 622 and 626 of RTA packets (RTA packets #1, #2, #3 and #4) whose initial transmissions were transmitted during TXOP on Link1. The time between two packet transmissions is a form of interframe spacing, but since STA4 obtained the channel later than STA3, it is preferably a short interframe spacing (SIFS). The number of backoff slots on the two links can be the same. STA3 and STA4 gain the channel at different times due to the CCA busy time during counting down backoff.

FIG. 28 illustrates an example embodiment 630 as Example 6-1-1 of a STA transmitting an RTA packet with unsolicited retry on multiple links. This example scenario arises when the LLTS Retransmission Policy is set to "unsolicited retry" and the packet duplication on multi-link is allowed. The network topology of this example is shown in FIG. 6. This example shows that the packet duplication in multi-link transmission can be performed when the end time of TXOPs reserved on two links differ, which can arise when the AP MLD and non-AP MLD are STR. It is also possible that this can arise in cases whereby the AP MLD is either STR or NSTR, and the non-AP MLD is either STR or NSTR.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting the RTA packets over multiple links.

RTA packets arrive 576 and STA3 and STA4 start to contend 578, 580 for the channel on Link1 and Link2 at the same time. STA3 obtains the TXOP duration 582 on Link1 first. Then, STA1 is able to transmit the initial transmissions 632, 636, 640 and 644 of the RTA packets (#1, #2, #3 and #4) during the TXOP on Link1.

The time between two successive packet transmissions can be an interframe spacing, such as xIFS, SIFS, PIFS or other spacing mechanism.

STA4 obtains the TXOP duration 584 on Link2 before the end of TXOP on Link1. STA4 reserves the TXOP whose end time is not the same as the end time of the TXOP on Link1. During the TXOP on Link2, STA4 transmits the retransmissions 634, 638, 642 and 646 of the RTA packets (#1, #2, #3 and #4) whose initial transmissions were transmitted during the TXOP on Link1.

It should be appreciated that MLD2 does not need to transmit any feedback to indicate the success of the RTA packet transmissions. The number of backoff slots on the two links can be the same. STA3 and STA4 gain the channel at different times due to CCA busy time during counting down the backoff.

FIG. 29 illustrates an example embodiment 650 as Example 6-2 of a STA transmitting an RTA packet with unsolicited retries on multiple links when the BA is allowed. This example scenario arises when the LLTS Retransmission Policy is set to "unsolicited retry with BA" and the packet duplication on multi-link is allowed. The network topology of this example is again that shown in FIG. 6.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting the RTA packets over multiple links.

RTA packets arrive 576 and STA3 and STA4 start to contend 578, 580, for the channel on Link1 and Link2 at the same time. STA3 obtains the channel access and reserves the TXOP duration 582 on Link1 first. Then, STA1 is able to transmit the initial transmissions 652, 656, 660 and 664 of the RTA packets (#1, #2, #3 and #4) during the TXOP on Link1. The time between two packet transmissions can be any desired interframe spacing, such as xIFS, SIFS, PIFS, or other spacing whose duration can be fixed (deterministic).

STA4 obtains and reserves the TXOP duration 584 on Link2 before the end of TXOP on Link1 by the end of the TXOP on Link1. During the TXOP on Link2, STA4 transmits the retransmissions 654, 658, 662 of the RTA packets whose initial transmissions are transmitted during the TXOP on Link1. Again the time between two packet transmissions can be an interframe spacing, such as xIFS, SIFS, PIFS, or other spacing mechanism.

STA4 in this example decides to transmit a BAR frame 666 to request BA feedback from STA6 before the end of the TXOP. The BA feedback 668 should contain packet loss information of both links. By way of example illustration, the BA frame could indicate that the initial transmissions of RTA packet #1, #3, and #4 on Link1 are successful while the initial transmissions of RTA packet #2 failed. The first retransmission of RTA packet #1 and packet #3 are successful but that the first retransmission of RTA packet #2 fails.

The BA in this example may be not transmitted for retransmissions but for adaptations, such as rate adaptation and unsolicited retry limit, of RTA packet transmissions in the future. The BA can also be used to choose which links will be selected for transmitting RTA packets and their unsolicited retry to satisfy the packet loss requirement of the RTA traffic.

The number of backoff slots on the two links can be the same. STA3 and STA4 gain channel access at different times due to CCA busy time during counting down the backoff. The BAR and BA frame format are shown in FIG. 33 and FIG. 34.

FIG. 30 illustrates an example embodiment 670 as Example 6-3 of a

STA transmitting an RTA packet with unsolicited retry on multiple links when the BA is allowed. This example scenario arises when the LLTS Retransmission Policy is set to "unsolicited retry" and the packet duplication on multi-link is allowed. The network topology of this example is that shown in FIG. 6.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting RTA packets over multiple links.

RTA packets arrive 576 and STA3 and STA4 start to contend 578, 580 for the channel on Link1 and Link2 at the same time. STA3 obtains the 1st TXOP duration 582 on Link1. Then, STA3 is able to transmit the initial transmissions 672, 676, 680 and 684 of the RTA packets (#1, #2, #3 and #4) during the TXOP on Link1. The time between two packet transmissions can be an interframe spacing xIFS, SIFS, PIFS, or similar spacing mechanism.

STA4 obtains and reserves the TXOP duration on Link2 before the end of 1st TXOP 582 on Link1. During the 1st TXOP on Link2, STA4 transmits 674, 678 and 682 the retransmissions of the RTA packets (#1, #2 and #3) whose initial transmissions were transmitted during the 1st TXOP on Link1. The time between two packet transmissions can be an interframe spacing, such as xIFS, SIFS, PIFS, or similar spacing mechanism. STA4 may not be able to retransmit all the RTA packets since the TXOP duration on Link2 is not of sufficient duration. For example, as shown in this example, the first retransmission of RTA packet #4 is not transmitted over Link2 since it cannot be transmitted within TXOP interval 584.

After the first TXOP ends, STA3 and STA4 in this example reset their backoffs 686, 688 to contend for the channel on Link1 and Link2 simultaneously. The number of backoff slots on the two links can be the same. STA3 and STA4 gain the channel at different times due to CCA busy time during counting down the backoff.

Then, STA4 and STA3 also obtain the 2nd TXOP as shown in the figure. STA4 obtains the second TXOP on Link2 690 and transmits 692 the retransmissions of the RTA packet #4. STA3 obtains the second TXOP 694 continues to transmit the initial transmissions 696, 700 and 704 on Link1 of for sending packets #5, #6 and #7. STA4 is seen performing retransmissions 698, 702 and 706 on Link2 for sending RTA packets #5, #6 and #7 whose first transmission is in the $2^{nd}$ TXOP on Link1. It should be noted that during the second TXOP on Link2, if the lifetime of RTA packet #4 does not expire, then STA4 can transmit its retransmission, such as a first retransmission of RTA packet #4, during the 2nd TXOP.

FIG. 31 illustrates an example embodiment 710 as Example 7 of a STA transmitting an RTA packet with unsolicited retries on multiple links when a BA is allowed. This example scenario arises when the LLTS Retransmission Policy is set to "unsolicited retry with BA" and the packet duplication in multi-link is allowed. The network topology of this example is shown in FIG. 6.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting the RTA packets over multiple links.

RTA packets arrive 576 and STA3 and STA4 start to simultaneously contend 578, 580 for the channel on Link1 and Link2. STA3 and STA4 obtain channel access and reserve TXOP duration on Link1 582 and Link2 584 at the same time. STA1 transmits the initial transmissions 712, 716, 720 and 724 of RTA packets (#1, #2, #3 and #4) during the TXOP on Link1. STA4 transmits 714, 718 and 722 on Link2 of the retransmissions of RTA packets (#1, #2 and #3) whose initial transmissions were transmitted during this same TXOP on Link1.

The time between two packet transmissions can be an interframe spacing xIFS, SIFS, PIFS, or similar spacing mechanism whose duration can be fixed (deterministic).

STA3 and STA4 can decide to transmit a BAR frame 724, 726 to request BA feedback from STA5 and STA6 before the end of the TXOP. The BAR and BA frames transmitted over Link2 are identical to those transmitted over Link1. The BA feedback 728, 730 preferably contains packet loss information for both links.

For example, the BA frame could indicate that the initial transmissions of RTA packet #1 and #3 on Link1 were successful while the initial transmissions of RTA packet #2 failed, and similarly that the first retransmission of RTA packet #1 and #2 were successful but the first retransmission of RTA packet #3 failed.

The BA in this example may be not transmitted for retransmissions but for adaptations, such as rate adaptation and unsolicited retry limit, of the RTA packet transmissions in the future. The BA could also be used to choose which links will be used for transmitting RTA packets and their unsolicited retry to satisfy the packet loss requirement of the RTA traffic.

It should be appreciated that it is possible that the number of backoff slots on the two links can be the same. It should be noted that it is possible that STA3 and STA4 gain channel access on Link 1 and 2 at the same time when one backoff time count reaches zero and the STAs wait another PIFS time to access the both links.

The BAR and BA frame format are shown in FIG. 33 and FIG. 34. It is possible that the BAR and BA frame may only carry the BA information of the link which the BAR and BA frames are transmitted. For example, the BAR and BA frame transmitted on Link1 may only carry the BA information of Link1.

FIG. 32 illustrates an example embodiment 750 as Example 8 of a STA transmitting an RTA packet with unsolicited retry on multiple links. The network topology of this example is shown in FIG. 6.

AP MLD 1 571 is to receive several RTA packets from MLD 2 (non-AP) (not shown) over multiple links. STA3 572 of MLD1 associates with STA5 (not shown) of MLD2 over Link1 and STA4 574 of MLD1 associates with STA6 (not shown) over Link2. The unsolicited retry is allowed for transmitting the RTA packets over multiple links.

STA3 and STA4 start to contend 578, 580 for the channel on Link1 and Link2 at the same time when they know that RTA packets have arrived in the queues. STA3 and STA4 obtain channel access and reserve the TXOP duration on Link1 582 and Link2 584 at the same time. STA3 and STA4 transmit identical trigger frames (TFs) 752, 754 to STA5 and STA6, respectively. When STA5 and STA6 receive the trigger frames, STA5 transmits 756, 760 the initial transmissions of the RTA packets #2 and #3, during the TXOP on Link1. STA6 transmits 758, 762 the retransmissions of the RTA packets #2 and #3 whose initial transmissions are being transmitted during the TXOP on Link1. The time between two packet transmissions can be an interframe spacing, such as xIFS, SIFS, PIFS, or similar spacing mechanism whose duration can be fixed (deterministic).

The format of TF can be similar to the TF defined in IEEE 802.11ax. It should be noted that STA3 and STA4 can gain channel access at different times. If the end of the TFs on both links can be aligned, the uplink transmissions and retransmissions over the two links can occur as shown in this example. It is possible that the number of backoff slots on the two links may be the same.

FIG. 33 illustrates an example embodiment 770 of a format for the Block Acknowledgement Request (BAR) frame. The purpose of this frame is to request the Block Acknowledge (BA) information on multiple links in one BA exchange. Meanwhile, the BA information exchange on each link can still follow the current IEEE 802.11 protocol, but is not limited to using that mechanism.

The BAR frame contains the following fields. A Frame Control field indicates the type of frame. A Duration field contains NAV information used for CSMA/CA channel access. An RA field contains an address for a recipient of the frame. A TA field contains the address of the STA that transmitted the frame. A BA Control field indicates the type of BA request and the type of block ACK request variant in the BAR information field. The format of the BA control field is shown in the lower portion of the figure.

Specifically, in at least one embodiment the bits between B5 and B11 which are reserved in BA control defined in the current IEEE 802.11 protocol are utilized in the present disclosure. By way of example and not limitation, one bit, referred to as a Multi-Link Mode subfield, is used to indicate that the BAR frame is to request information for multiple links. When the Multi-Link Mode field is set to a first state (e.g., "1"), then the BAR information field in the BAR frame will carry the corresponding BlockAckReq variants of multiple links. When the Multi-Link Mode field is set to a second state (e.g., "0"), then the BAR information field will carry the corresponding BlockAckReq variants as defined in the current IEEE 802.11 protocol, which is shown in Table 7. The remaining bits of the BA control field are the same as defined in the current IEEE 802.11 protocol.

A BAR information field is used to carry the corresponding BlockAckReq variant according to the setting in BA control field. In this case the figure shows the format of the BAR information field when the Multi-Link Mode field is set to a first state (e.g., "1"). In this way, when the STA receives this BAR frame, it can send the corresponding BA information of multiple links in one BA frame. The subfields in the BAR information are as follows.

A Link Information subfield indicates which link the following BlockAckReq variants will be applied to. A Length subfield indicates the length of BlockAckReq variant fields with respect to the link. A BlockAckReq variant subfield carries the corresponding BlockAckReq variants defined in IEEE 802.11. The types of the BlockAckReq and their corresponding parameter setting in the BA control field are shown in Table 7. The receiver STA can respond to the corresponding BA information following the rule of current IEEE 802.11 protocol for each link and put them in one BA frame. It should be noted that the above three fields are added to the BAR information field per link.

FIG. 34 illustrates an example embodiment 790 of a format of the BA Response frame. The purpose of this frame is to respond with BA information on multiple links in one BA exchange. Meanwhile, the BA information exchange on each link can still follow the current IEEE 802.11 protocol.

A Frame Control field indicates the type of frame. A Duration field contains NAV information used for CSMA/CA channel access. An RA field contains an address for the recipient of the frame. A TA field contains the address of the STA that transmitted the frame. A BA Control field indicates the type of BA request and the type of block ACK request variant in the BAR information field. The format of the BA control field is shown in the lower portion of the figure.

Specifically, in at least one embodiment the bits between B5 and B11 are reserved in BA control defined in the current IEEE 802.11 protocol. By way of example and not limitation the present disclosure uses one bit of those previously reserved bits as a Multi-Link Mode subfield, for indicating that the BA frame is to provide the information of multiple links. When the Multi-Link Mode field is set to a first state (e.g., "1"), then the BA information field carries the corresponding BlockAck variants of multiple links. When the Multi-Link Mode field is set to a second state (e.g., "0"), then the BA information field will carry the corresponding BlockAck variants as defined in the current IEEE 802.11 protocol, which is shown in Table 8. The remaining bits of the BA control field are preferably the same as defined in the current IEEE 802.11 protocol.

A BA information field is used to carry the corresponding BlockAck variants according to the setting in the BA control field. In this case the figure shows the format of the BA information field when the Multi-Link Mode field is set to a first state (e.g., "1"). In this way, when a STA receives this BA frame, it can recognize that the BA information field carries the BlockAck Variant of multiple links. A Link Info subfield indicates which link the following BlockAck variants will be applied to. A Length subfield indicates the length of BlockAck variant field with respect to the link. A BlockAck variants subfield carries the corresponding BlockAck variants defined in IEEE 802.11. The types of the BlockAck and their corresponding parameter settings in the BA control field is shown in Table 8. The receiver STA can receive packet failure information of each link from BlockAck variants fields. It should be noted that the above three fields are added to the BA information field per link.

FIG. 35 illustrates an example embodiment 810 as Example 9 of a STA transmitting an RTA packet with unsolicited retry on multiple links. The network topology of this example is shown in FIG. 6.

Transmitter MLD 1 571 is to transmit several RTA packets to Receiver MLD 2 (AP) (not shown) over multiple links. STA3 572 of MLD1 transmits packets to STA5 (not shown) of MLD2 over Link1 and STA4 574 of MLD1 transmits packets to STA6 (not shown) over Link2. The unsolicited retry is allowed for transmitting the RTA packets over multiple links.

After RTA packets arrive STA3 and STA4 start to contend 578, 580 for the channel on Link1 and Link2 at the same time. STA3 obtains TXOP on Link1 582 and STA4 obtains TXOP on Link2 584. STA3 and STA4 may obtain channel access on Link1 and Link2 at different times but their end times for the TXOP are the same. The duration of TXOP on each link are chopped (sequenced) by Downlink periods (i.e., DL as shown in the figure) and Uplink periods (i.e., UL as shown in the figure). The start time of the first DL period 812, 814 on the two links can be different but the end time of those two DL periods should be aligned.

After that, the figure depicts interspersed UL and DL periods 816, 818, 820, 822, 824 and 826 with the end of these periods on the two links being aligned as shown in the figure. When the DL period is to switch to a UL period, STA3 and STA4 can transmit duplicated TFs on both links at the same time to request the UL transmission. When the UL period ends, AP MLD can start another DL period 828 on both links, with backoffs 830, 832 commencing.

No matter whether in a DL period or a UL period, STA3 transmits or receives the initial transmission of the packets over Link1 and STA4 transmits or receives the retransmission of the packets over Link2. The first DL periods shown in the figure can use the methods as described in previous examples, such as Example 6-1, to align the end time of the DL periods. In addition, it will be noted that the number of backoff slots on the two links can be the same. STA3 and STA4 may gain the channel at different times due to CCA busy time during counting down the backoff.

FIG. 36 illustrates an example embodiment 850 as Example 10 of a STA transmitting an RTA packet with unsolicited retries on a single link. This example scenario arises when the LLTS Retransmission Policy is set to "unsolicited retry" and the packet duplication in RU is allowed. The network topology of this example is shown in FIG. 6, and FIG. 36 depicts interactions between a receiver exemplified as STA0 (AP) 852, and transmitters STA1 854 and STA2 856.

STA0 (AP) is to receive RTA packets from STA1 and STA2. The unsolicited retry is allowed for transmitting the RTA packet. When STA0 gains channel access, it sends a TF 858 to STA1 and STA2. The format of TF can be similar to the TF defined in IEEE 802.11ax, but is not limited thereto. According to the TF, STA0 distributes RU1 and RU3 to STA1 for RTA packet transmission and STA0 distributes RU2 and RU4 to STA2 for RTA packet transmission.

STA1 transmits a frame having a header 860 and containing the initial transmission 864 of RTA packet #1 on RU1, and the retransmission 866 of RTA packet #1 on RU3.

STA2 transmits a frame having a header 862 and containing the initial transmission 868 of RTA packet #2 on RU2, and a retransmission 870 of RTA packet #2 on RU4.

It should be appreciated that STA 1 and STA2 may set the retry subfield to a first state (e.g., "1") in the MAC headers of the initial transmission of RTA packet #1 and #2 for packet duplication detection.

FIG. 37 illustrates an example embodiment 890 as Example 11 of a STA transmitting an RTA packet with unsolicited retries on a single link. This example scenario arises when the LLTS Retransmission Policy is set to "unsolicited retry" and the packet duplication in RU is allowed. The network topology of this example is shown in FIG. 6 and FIG. 36 depicts interactions between a receiver exemplified as STA0 (AP) 892, and transmitters STA1 894 and STA2 896.

STA0 (AP) is to transmit RTA packets to STA1 and STA2. The unsolicited retry is allowed for transmitting the RTA packet. When STA0 gains channel access, it sends an MU-PPDU packet to STA1 and STA2. The format of MU-PPDU packet could be similar to the MU PPDU defined in IEEE 802.11ax. In this example, the packet is seen with header 898 with RUs utilized as follows. STA0 uses RU1 to transmit the initial transmission 900 of RTA packet #1 and RU3 to transmit the retransmission 904 of RTA packet #1. STA0 uses RU2 to transmit the initial transmission 902 of RTA packet #2 and RU4 to transmit the retransmission 906 of RTA packet #2. It should be noted that STA0 may set the retry subfield to a first state (e.g., "1") in the MAC headers of the initial transmission of RTA packet #1 and #2 for packet duplication detection.

It should be appreciated that in this and previous examples, RUs may be selected for use as desired in performing transmissions and retransmissions, and are thus not limited by these specific illustrative examples.

5. General Scope of Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were selectively depicted for the sake of simplicity of illustration, as one of ordinary skill in the art recognizes the use of computer devices for carrying out steps involved with digital wireless communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), form ula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured as a first wireless station for wirelessly communicating over at least one channel with at least one other wireless station on a local area network (WLAN) in a reception area of the first wireless station; (b) said first wireless station including a processor configured for operating on the WLAN; (c) a non-transitory memory storing instructions executable by the processor; and (d) wherein said instructions, when executed by the processor, perform steps comprising: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist and RTA traffic is given a higher priority of transmission than lower priority traffic; (d)(ii) distinguishing real-time application (RTA) packets from non-real-time application (non-RTA) packets; (d)(iii) setting up an unsolicited retry policy for RTA packets in which the station retransmits RTA packets in time and frequency, or other links, under this unsolicited retry policy without waiting for feedback; (d)(iv) setting up a block acknowledgement agreement to receive the feedback for adaptation of the packet transmission in the future; and (d)(v) dropping an RTA packet if a retry count for that packet exceeds the unsolicited retry limit or a lifetime of that packet has expired.

2. An apparatus for wireless communication in a network, the apparatus comprising: (a) a wireless communication circuit configured as a first wireless station for wirelessly communicating over at least one channel with at least one other wireless station on a local area network (WLAN) in a reception area of the first wireless station; (b) said first wireless station including a processor configured for operating on the WLAN; (c) a non-transitory memory storing instructions executable by the processor; and (d) wherein said instructions, when executed by the processor, perform steps comprising: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) and multi-link operations, and in which real time application (RTA) traffic and non-RTA traffic coexist and RTA traffic is given a higher priority of transmission than lower priority traffic; (d)(ii) distinguishing real-time application (RTA) packets from non-real-time application (non-RTA) packets; (d)(iii) setting up an unsolicited retry policy for RTA packets in which the station retransmits RTA packets in time and frequency, or other links, under this unsolicited retry policy without waiting for feedback; (d)(iv) setting up an unsolicited retry policy for RTA packets in a multi-link scenario by a station which comprises a multi-link device (MLD); (d)(v) said multi-link device (MLD) commencing to count down a backoff time in contending for channel access on multiple links at the same time; (d)(vi) gaining channel access by said multi-link device (MLD) for a first link, when the backoff time on said first link counts down to zero; (d)(vii) reserving a transmit opportunity (TXOP) by said multi-link device (MLD) for transmitting an initial transmission of RTA packets on said first link; (d)(viii) gaining channel access on one or more other links if the backoff time on said first link counts down to zero before TXOP ends on said first link; (d)(ix) reserving the TXOP on the other links, before TXOP ends on said first link, for transmitting retransmissions of the RTA packets on the other links; and (d)(x) resetting the backoff time on said first link and said other links when the TXOP ends on said first link.

3. An apparatus for wireless communication in a network, the apparatus comprising: (a) a wireless communication circuit configured as a first wireless station for wirelessly communicating over at least one channel with at least one other wireless station on a local area network (WLAN) in a reception area of the first wireless station; (b) said first wireless station including a processor configured for operating on the WLAN; (c) a non-transitory memory storing instructions executable by the processor; and (d) wherein said instructions, when executed by the processor, performing: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) and multi-link operations, in which real time application (RTA) traffic and non-RTA traffic coexist and RTA traffic is given a higher priority of transmission than lower priority traffic; (d)(ii) distinguishing real-time application (RTA) packets from non-real-time application (non-RTA) packets; (d)(iii) setting up an unsolicited retry policy for RTA packets in a multi-link scenario by a station which comprises a multi-link device (MLD) which is either an access point multi-link device (AP-MLD) which is configured for simultaneous transmit/receive (STR), or a non-access point multi-link device (non-AP MLD) which is not configured for simultaneous transmit/receive (non-STR); (d)(iv) obtaining a TXOP, by said AP-MLD for transmitting to a non-AP MLD, commencing with setting backoff time on all the links to a random number for use in contending for the channel; (d)(v) independently counting down backoff time by said AP-MLD on each link to gain channel access on each link when backoff time on that link counts down to zero; (d)(vi) reserving the TXOP on a first link when it gains channel access; (d)(vii) reserving the TXOP on other links if said AP-MLD gains channel access on other links before first link TXOP ends, and limiting the end time for a TXOP on those other links to be no later than the end time of TXOP of said first link; and (d)(viii) failing to obtain the TXOP on said first link or said other links, when said AP-MLD does not gain channel access before TXOP ends for said first link.

4. A wireless communication system/apparatus performing transmission of packets, where CSMA/CA is applied, the real time application (RTA) traffic and non-RTA traffic coexist in the system/apparatus, comprising: (a) STA sets up unsolicited retry policy for RTA packets; (b) STA retransmits RTA packets in time and frequency or other links under this unsolicited retry policy without waiting for feedback; (c) STA sets up a block ACK agreement to receive the feedback for adaptation of the packet transmission in the future; (d) STA drops an RTA packet if the retry count of that packet exceeds the unsolicited retry limit or the lifetime of that packet expires.

5. A wireless communication system/apparatus performing transmission of packets, where CSMA/CA is applied, the real time application (RTA) traffic and non-RTA traffic coexist in the system/apparatus, comprising: (a) STA distinguishes RTA traffic and non-RTA traffic; and (b) STA transmits or retransmits a same RTA packet multiple times in the same TXOP without waiting for feedback.

6. A wireless communication system/apparatus performing transmission of packets, where CSMA/CA is applied, the real time application (RTA) traffic and non-RTA traffic coexist in the system/apparatus, comprising: (a) STA distinguishing RTA traffic and non-RTA traffic; (b) STA setting up an unsolicited retry policy for the RTA traffic; and (c) STA transmitting or retransmitting a same RTA packet multiple times without waiting for feedback according to the unsolicited retry policy.

7. A wireless communication system/apparatus performing transmission of packets, where CSMA/CA is applied, the real time application (RTA) traffic and non-RTA traffic coexist in the system/apparatus, an RTA connection-oriented communication is established by an application between STAs is called an RTA session, comprising: (a) originator STA sending a request frame to a recipient STA to set up a low latency transmission service (LLTS) for identifying traffic of an RTA session; (b) recipient STA receiving the request frame sends a response frame back to originator STA; (c) LLTS successfully being established when the Originator STA receives a response frame that grants the LLTS.

8. The apparatus or system of any preceding embodiment, wherein said unsolicited retry policy for RTA packets further comprises establishing an unsolicited retry limit.

9. The apparatus or system of any preceding embodiment, wherein said unsolicited retry policy for RTA packets further comprises allowing the unsolicited retry policy to be changed at any time.

10. The apparatus or system of any preceding embodiment, wherein said unsolicited retry policy for RTA packets further comprises allowing the STA setting up the unsolicited retry policy to terminate it at any time.

11. The apparatus or system of any preceding embodiment, wherein said instructions when executed by the processor further perform one or more steps comprising retransmitting the same MAC protocol data units (MPDUs) in the same TXOP when retransmitting RTA packets under said unsolicited retry policy.

12. The apparatus or system of any preceding embodiment, wherein a PPDU is a Physical Layer Conformance Procedure (PLCP) Protocol Data Unit (PPDU); and wherein said instructions when executed by the processor further performing enabling an Access Point (AP) station to retransmit RTA packets under said unsolicited retry policy by transmitting the initial transmission of the RTA packet on a Resource Unit (RU) of a Multi-User (MU) PPDU packet and its retransmission on another RU of that MU-PPDU packet.

13. The apparatus or system of any preceding embodiment, wherein a PPDU is a Physical Layer Conformance Procedure (PLCP) Protocol Data Unit (PPDU); and wherein said instructions when executed by the processor further performs enabling a non-access point station to retransmit RTA packets under said unsolicited retry policy by transmitting an initial transmission of an RTA packet on a Resource Unit (RU) of a trigger based (TB) PPDU packet and its retransmission on another RU of that TB-PPDU packet.

14. The apparatus or system of any preceding embodiment, wherein said instructions when executed by the processor further performing enabling a station to retransmit RTA packets under said unsolicited retry policy by transmitting retransmissions of an RTA packet upon the station finishing its initial transmission of that RTA packet, and without the necessity of receiving prior feedback on packet reception.

15. The apparatus or system of any preceding embodiment, wherein said instructions when executed by the processor further performing adjusting said unsolicited retry limit for future transmissions according to feedback received by the station transmitting RTA packets.

16. The apparatus or system of any preceding embodiment, wherein said instructions when executed by the processor further performing adjusting a modulation coding scheme (MCS) being utilized according to feedback received by the station transmitting RTA packets.

17. The apparatus or system of any preceding embodiment, wherein said instructions when executed by the processor for contending for channel access on multiple links further comprises reserving a transmit opportunity (TXOP) for non-RTA packet transmission, as well as RTA packet transmissions.

18. The apparatus or system of any preceding embodiment, wherein said instructions when executed by the processor performing said unsolicited retry policy for RTA packets in a multi-link scenario further comprises receiving a block acknowledgement (BA) frame to report packet loss of each link.

19. The apparatus or system of any preceding embodiment, wherein block acknowledgement (BA) frames received by the multi-link device (MLD) on one link is configured to contain packet loss information for said first link and said other links.

20. The apparatus or system of any preceding embodiment, wherein upon receiving a block acknowledgement (BA) frame by said multi-link device (MLD), said instructions when executed by the processor further perform utilizing packet loss information in the BA frame in determining which link to use for future RTA packet transmissions.

21. The apparatus or system of any preceding embodiment, wherein said instructions when executed by the processor for resetting the backoff time on said first link and said other links further comprises resetting the backoff time for an equal number of backoff slots on said first link and said other links.

22. The apparatus or system of any preceding embodiment, wherein the STA setting up unsolicited retry policy for RTA packets performs setting the unsolicited retry limit.

23. The apparatus or system of any preceding embodiment, wherein the STA setting up unsolicited retry policy for RTA packets performs changing the unsolicited retry policy at any time.

24. The apparatus or system of any preceding embodiment, wherein the STA setting up unsolicited retry policy for RTA packets performs terminating the unsolicited retry policy at any time.

25. The apparatus or system of any preceding embodiment, wherein the STA retransmitting RTA packets under this unsolicited retry policy performs retransmitting the same MAC protocol data units (MPDUs) in the same TXOP.

26. The apparatus or system of any preceding embodiment, wherein the AP retransmitting RTA packets under this unsolicited retry policy transmits an initial transmission of an RTA packet on an RU of a MU-PPDU packet and its retransmission on another RU of that MU-PPDU packet.

27. The apparatus or system of any preceding embodiment, wherein the non-AP STA retransmitting RTA packets under this unsolicited retry policy transmits the initial transmission of the RTA packet on an RU of a TB-PPDU packet and its retransmission on another RU of that TB-PPDU packet.

28. The apparatus or system of any preceding embodiment, wherein the STA retransmitting RTA packets under this unsolicited retry policy transmits the retransmissions of an RTA packet immediately after the STA finishes the initial transmission of that RTA packet without receiving any feedback.

29. The apparatus or system of any preceding embodiment, wherein the STA receiving feedback performs adjusting the unsolicited retry limit according to the feedback.

30. The apparatus or system of any preceding embodiment, wherein the STA receiving the feedback adjusts the MCS according to the feedback.

31. The apparatus or system of any preceding embodiment, wherein the STA distinguishing RTA traffic and non-RTA traffic performing setting up a LLTS for RTA packets.

32. The apparatus or system of any preceding embodiment, wherein the STA performs transmitting or retransmitting of RTA packets without waiting for feedback then performs setting up an unsolicited retry limit which represents the max number of retransmissions of the RTA packet using unsolicited retry.

33. The apparatus or system of any preceding embodiment, wherein the STA transmitting an RTA packet multiple times without waiting for feedback performs retransmitting the same RTA packet at different times in the same TXOP.

34. The apparatus or system of any preceding embodiment, wherein the STA transmitting an RTA packet multiple times without waiting for feedback performs retransmitting the same RTA packet over different RUs of a single MU-PPDU or TB-PPDU.

35. The apparatus or system of any preceding embodiment, wherein the STA affiliated with a MLD transmitting an RTA packet multiple times on one link without waiting for feedback performs letting other STAs affiliated with the same MLD retransmit the same RTA packet over other links.

36. The apparatus or system of any preceding embodiment, wherein the STA transmitting an RTA packet multiple times without waiting for feedback performs re-contending for the channel when it transmits the same RTA packet for one more time in the same TXOP.

37. The apparatus or system of any preceding embodiment, wherein the STA transmitting an RTA packet multiple times without waiting for feedback performs transmitting the same RTA packet for one more time in the same TXOP after an interframe spacing time.

38. The apparatus or system of any preceding embodiment, wherein the STA transmitting an RTA packet multiple times without waiting for feedback performs dropping the RTA packet if the retry count of that packet exceeds the unsolicited retry limit or the lifetime of that packet expires.

39. The apparatus or system of any preceding embodiment, wherein the STA setting up unsolicited retry policy for RTA traffic performs setting up a block ACK agreement to request block ACK for RTA packets after multiple unsolicited retries of the RTA packets.

40. The apparatus or system of any preceding embodiment, wherein the STA distinguishing RTA traffic and non-RTA traffic performs setting up a LLTS for RTA packets.

41. The apparatus or system of any preceding embodiment, wherein the STA setting up the unsolicited retry policy for RTA traffic performs changing the unsolicited retry policy at any time.

42. The apparatus or system of any preceding embodiment, wherein the STA setting up unsolicited retry policy for RTA traffic performs setting up a block ACK agreement to request block ACK for RTA packets after multiple unsolicited retries of the RTA packets.

43. The apparatus or system of any preceding embodiment, wherein the STA transmitting or retransmitting RTA packets without waiting for feedback performs setting the unsolicited retry limit which represents the max number of retransmissions of the RTA packet using unsolicited retry.

44. The apparatus or system of any preceding embodiment, wherein the STA transmitting or retransmitting an RTA packet without waiting for feedback performs retransmitting the same RTA packet multiple times in the same TXOP.

45. The apparatus or system of any preceding embodiment, wherein the STA transmitting or retransmitting an RTA packet multiple times without waiting for feedback performs retransmitting the same RTA packet at different times in the same TXOP.

46. The apparatus or system of any preceding embodiment, wherein the STA transmitting or retransmitting an RTA packet multiple times without waiting for feedback performs retransmitting the same RTA packet over different RUs of a single MU-PPDU or TB-PPDU.

47. The apparatus or system of any preceding embodiment, wherein the STA affiliated with a MLD performs transmitting or retransmitting an RTA packet multiple times on one link without waiting feedback could let other STAs affiliated with the same MLD retransmit the same RTA packet over other links.

48. The apparatus or system of any preceding embodiment, wherein the STA transmitting or retransmitting an RTA packet multiple times without waiting for feedback performs re-contending for the channel when it transmits the same RTA packet for one more time in the same TXOP.

49. The apparatus or system of any preceding embodiment, wherein the STA transmitting or retransmitting an RTA packet multiple times without waiting for feedback performs transmitting the same RTA packet for one more time in the same TXOP after an interframe spacing time.

50. The apparatus or system of any preceding embodiment, wherein the STA transmitting or retransmitting an RTA packet multiple times without waiting for feedback performs dropping the RTA packet if the retry count of that packet exceeds the unsolicited retry limit or the lifetime of that packet expires.

51. The apparatus or system of any preceding embodiment, wherein the originator STA setting up a LLTS performs setting up an ID for the LLTS used to distinguish the LLTS of the originator/receipt STA from other LLTSs.

52. The apparatus or system of any preceding embodiment, wherein the originator STA setting up a LLTS performs indicating the QoS requirements, such as latency, jitter and packet loss of the LLTS in the request frame.

53. The apparatus or system of any preceding embodiment, wherein the originator STA setting up a LLTS performs reusing the TSPEC element as defined in IEEE 802.11 with additional information to indicate the QoS requirements, such as latency, jitter and packet loss, and specifications of the LLTS in the request frame.

54. The apparatus or system of any preceding embodiment, wherein the originator STA setting up a LLTS performs reusing TCLAS element as defined in IEEE 802.11 to identify whether the traffic from upper layer belongs to the LLTS.

55. The apparatus or system of any preceding embodiment, wherein the originator STA setting up a LLTS performs setting up an unsolicited retry policy for the LLTS.

56. The apparatus or system of any preceding embodiment, wherein the recipient STA receiving the request frame for a LLTS setup performs accepting the LLTS setup.

57. The apparatus or system of any preceding embodiment, wherein the recipient STA receiving the request frame for a LLTS setup performs rejecting the LLTS setup.

58. The apparatus or system of any preceding embodiment, wherein the recipient STA sending a request frame for a LLTS setup performs reusing the TSPEC element as defined in IEEE 802.11 with additional information to indicate the QoS parameter of the LLTS in the request frame.

59. The apparatus or system of any preceding embodiment, wherein the LLTS is set up successfully and performs allowing the Originator STA to send a request frame to update the LLTS.

60. The apparatus or system of any preceding embodiment, wherein the LLTS is set up successfully and allows the Originator STA to send a request frame to terminate the LLTS.

61. The apparatus or system of any preceding embodiment, wherein the LLTS is set up successfully and performs letting the recipient STA to send a response frame to terminate the LLTS.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method. In addition, when the disclosure refers to operations which "can" or "should" (or similar wording) be performed by the instructions, then this indicates that the operation is performed in at least one embodiment and/or mode of the present disclosure, and more generally most of the embodiments and/or modes of the present disclosure, but that there could be instances, where for any of a variety of reasons, these instructions are overridden or otherwise not performed.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", and "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| MLME-LLTS.request | | | |
|---|---|---|---|
| Function | MLME-LLTS.request (DialogToken, LLTSRequest, STAAddress) | | |
| When Generated | SME generates this message and passes it to its MLME when the non-AP STA decides to initiate an LLTS setup procedure | | |
| Effect of Receipt | When MLME of STA receives this message, it transmits LLTS request to recipient | | |
| | Name | Type | Description |
| Parameters | Dialog Token | Integer | Specifies the LLTS transaction |
| | LLTS Request | (see FIG. 7) | SME specifies the parameters in the LLTSRequest element so that MLME will copy this element in LLTS request frame to launch an LLTS setup procedure |

TABLE 1-continued

MLME-LLTS.request

| | | |
|---|---|---|
| STA Address | MAC Address | SME specifies the MAC address of the receipt of the LLTS request frame. When MLME receives this field, it should set the Address 1 field to this STAAddress in the LLTS request frame |

TABLE 2

MLME-LLTS.indication

| | |
|---|---|
| Function | MLME-LLTS.indication (DialogToken, LLTSRequest, STAAddress) |
| When Generated | MLME of STA generates this message and passes it to its SME when the MLME of STA receives an LLTS request frame for an LLTS setup |
| Effect of Receipt | When SME of STA receives message, it decides whether to accepts LLTS setup |

| | Name | Type | Description |
|---|---|---|---|
| Parameters | Dialog Token | Integer | Specifies the LLTS transaction |
| | LLTS Request | (see FIG. 7) | MLME copies parameters in LLTSRequest from LLTS request frame so that SME can make decision to accept/reject an LLTS setup procedure according to those parameters |
| | STA Address | MAC Address | MLME specifies MAC address who transmits LLTS request & when SME receives it, it uses this MAC address in STAAddress of corresponding MLME-LLTS.response function |

TABLE 3

MLME-LLTS.response

| | |
|---|---|
| Function | MLME-LLTS.response (DialogToken, LLTSResponse, STAAddress) |
| When Generated | SME of STA generates message and transmits it to its MLME when STA makes decision of LLTS setup requested from originator |
| Effect of Receipt | When MLME receives message, it transmits an LLTS response frame to originator |

| | Name | Type | Description |
|---|---|---|---|
| Parameters | Dialog Token | Integer | Specifies the LLTS transaction |
| | LLTS Response | (see FIG. 11) | SME specifies parameters in LLTSResponse so that MLME copies this element in LLTS response to launch an LLTS setup procedure |
| | STA Address | MAC Address | SME specifies MAC address of receipt of LLTS response frame & when MLME receives it, it uses MAC address in the Address 1 field of the LLTS response frame |

TABLE 4

| | MLME-LLTS.confirm | | |
|---|---|---|---|
| Function | MLME-LLTS.confirm (DialogToken, LLTSResponse, STAAddress) | | |
| When Generated | MLME of STA generates this message and passes it to its SME when MLME of STA receives an LLTS response frame | | |
| Effect of Receipt | When SME of STA receives message, it knows LLTS setup result from recipient STA | | |
| | Name | Type | Description |
| Parameters | Dialog Token | Integer | Specifies the LLTS transaction |
| | LLTS Response | (see FIG. 11) | MLME copies parameters in LLTSResponse element so that SME knows results for LLTS setup |
| | STA Address | MAC Address | SME specifies MAC address of STA who transmits LLTS response frame & when MLME receives it, it knows from which STA it received the response |

20

TABLE 5

| | MLME-LLTS-TERM.request | | |
|---|---|---|---|
| Function | MLME-LLTS.request (DialogToken, LLTSRequest, STAAddress) | | |
| When Generated | SME of STA generates this message and passes it to its MLME when non-AP STA decides to initiate an LLTS setup procedure | | |
| Effect of Receipt | When the MLME of STA receives this message, it transmits an LLTS response frame to the recipient STA | | |
| | Name | Type | Description |
| Parameters | Dialog Token | Integer | Specifies the LLTS transaction |
| | LLTS Response | (see FIG. 11) | SME specifies parameters in LLTSResponse element so that MLME will copy this element in LLTS response frame to launch an LLTS termination procedure |
| | STA Address | MAC Address | SME specifies MAC address of receipt of LLTS request frame & when MLME receives this, it sets Address 1 field in LLTS response frame |

TABLE 6

| | MLME-LLTS-TERM.indication | | |
|---|---|---|---|
| Function | MLME-LLTS.indication (DialogToken, LLTSRequest, STAAddress) | | |
| When Generated | MLME of STA generates this message and passes it to its SME when MLME of STA receives an LLTS response frame for an LLTS termination | | |
| Effect of Receipt | When SME of STA receives message, it is informed which LLTSs are terminated | | |
| | Name | Type | Description |
| Parameters | Dialog Token | Integer | Specifies the LLTS transaction |
| | LLTS Response | (see FIG. 11) | MLME copies parameters in LLTSResponse element from LLTS response frame so that SME can know which LLTSs are terminated |
| | STA Address | MAC Address | MLME specifies MAC address of STA that transmitted LLTS request frame & when MLME receives this, it knows from which STA it received LLTS response |

TABLE 7

BlockAckReq Frame Variant Encoding SubField Values

| GCR | Multi-TID | Compressed Bitmap | BlockAckReq Frame variant |
|---|---|---|---|
| 0 | 0 | 0 | Basic BlockAckReq |
| 0 | 0 | 1 | Compressed BlockAckReq |
| 0 | 1 | 0 | Extended Compressed BlockAckReq |
| 0 | 1 | 1 | Multi-TID BlockAckReq |
| 1 | 0 | 0 | Reserved |
| 1 | 0 | 1 | GCR BlockAckReq |
| 1 | 1 | 0 | Reserved |
| 1 | 1 | 1 | Reserved |

TABLE 8

Multi-link BlockAckReq Frame Variant Encoding SubField Values

| GCR | Multi-TID | Compressed Bitmap | BlockAckReq Frame variant |
|---|---|---|---|
| 0 | 0 | 0 | Basic BlockAck |
| 0 | 0 | 1 | Compressed BlockAck |
| 0 | 1 | 0 | Extended Compressed BlockAck |
| 0 | 1 | 1 | Multi-TID BlockAck |
| 1 | 0 | 0 | Reserved |
| 1 | 0 | 1 | GCR BlockAck |
| 1 | 1 | 0 | Reserved |
| 1 | 1 | 1 | Reserved |

What is claimed is:

1. An apparatus for wireless communication in a network, the apparatus comprising:

(a) a wireless communication circuit configured as a first wireless station for wirelessly communicating over at least one channel with at least one other wireless station on a local area network (WLAN) in a reception area of the first wireless station;

(b) said first wireless station including a processor configured for operating on the WLAN;

(c) a non-transitory memory storing instructions executable by the processor; and (d) wherein said instructions, when executed by the processor, perform steps comprising:

(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) in which real time application (RTA) traffic and non-RTA traffic coexist and RTA traffic is given a higher priority of transmission than lower priority traffic;

(ii) distinguishing real-time application (RTA) packets from non-real-time application (non-RTA) packets;

(iii) setting up an unsolicited retry policy for RTA packets in which the station retransmits RTA packets in time and frequency, or other links, under this unsolicited retry policy without waiting for feedback;

(iv) setting up a block acknowledgement agreement to receive the feedback for adaptation of the packet transmission in the future; and (v) dropping an RTA packet if a retry count for that packet exceeds the unsolicited retry limit or a lifetime of that packet has expired.

2. The apparatus as recited in claim 1, wherein said unsolicited retry policy for RTA packets further comprises establishing an unsolicited retry limit.

3. The apparatus as recited in claim 1, wherein said unsolicited retry policy for RTA packets further comprises allowing the unsolicited retry policy to be changed at any time.

4. The apparatus as recited in claim 1, wherein said unsolicited retry policy for RTA packets further comprises allowing the station setting up the unsolicited retry policy to terminate it at any time.

5. The apparatus as recited in claim 1, wherein said instructions when executed by the processor further perform one or more steps comprising retransmitting the same MAC protocol data units (MPDUs) in the same TXOP when retransmitting RTA packets under said unsolicited retry policy.

6. The apparatus as recited in claim 1:
wherein a PPDU is a Physical Layer Conformance Procedure (PLCP) Protocol Data Unit (PPDU); and
wherein said instructions when executed by the processor further performing enabling an Access Point (AP) station to retransmit RTA packets under said unsolicited retry policy by transmitting the initial transmission of the RTA packet on a Resource Unit (RU) of a Multi-User (MU) PPDU packet and its retransmission on another RU of that MU-PPDU packet.

7. The apparatus as recited in claim 1:
wherein a PPDU is a Physical Layer Conformance Procedure (PLCP) Protocol Data Unit (PPDU); and
wherein said instructions when executed by the processor further performs enabling a non-access point station to retransmit RTA packets under said unsolicited retry policy by transmitting an initial transmission of an RTA packet on a Resource Unit (RU) of a trigger based (TB) PPDU packet and its retransmission on another RU of that TB-PPDU packet.

8. The apparatus as recited in claim 1, wherein said instructions when executed by the processor further performing enabling a station to retransmit RTA packets under said unsolicited retry policy by transmitting retransmissions of an RTA packet upon the station finishing its initial transmission of that RTA packet, and without the necessity of receiving prior feedback on packet reception.

9. The apparatus as recited in claim 1, wherein said instructions when executed by the processor further performing adjusting said unsolicited retry limit for future transmissions according to feedback received by the station transmitting RTA packets.

10. The apparatus as recited in claim 1, wherein said instructions when executed by the processor further performing adjusting a modulation coding scheme (MCS) being utilized according to feedback received by the station transmitting RTA packets.

11. An apparatus for wireless communication in a network, the apparatus comprising:

(a) a wireless communication circuit configured as a first wireless station for wirelessly communicating over at least one channel with at least one other wireless station on a local area network (WLAN) in a reception area of the first wireless station;

(b) said first wireless station including a processor configured for operating on the WLAN;

(c) a non-transitory memory storing instructions executable by the processor; and
(d) wherein said instructions, when executed by the processor, perform steps comprising:
  (i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) and multi-link operations, and in which real time application (RTA) traffic and non-RTA traffic coexist and RTA traffic is given a higher priority of transmission than lower priority traffic;
  (ii) distinguishing real-time application (RTA) packets from non-real-time application (non-RTA) packets;
  (iii) setting up an unsolicited retry policy for RTA packets in which the station retransmits RTA packets in time and frequency, or other links, under this unsolicited retry policy without waiting for feedback;
  (iv) setting up an unsolicited retry policy for RTA packets in a multi-link scenario by a station which comprises a multi-link device (MLD);
  (v) said multi-link device (MLD) commencing to count down a backoff time in contending for channel access on multiple links at the same time;
  (vi) gaining channel access by said multi-link device (MLD) for a first link, when the backoff time on said first link counts down to zero;
  (vii) reserving a transmit opportunity (TXOP) by said multi-link device (MLD) for transmitting an initial transmission of RTA packets on said first link;
  (viii) gaining channel access on one or more other links if the backoff time on said first link counts down to zero before TXOP ends on said first link;
  (ix) reserving the TXOP on the other links, before TXOP ends on said first link, for transmitting retransmissions of the RTA packets on the other links; and
  (x) resetting the backoff time on said first link and said other links when the TXOP ends on said first link.

12. The apparatus as recited in claim 11, wherein said contending for channel access on multiple links further comprises reserving a transmit opportunity (TXOP) for non-RTA packet transmission, as well as RTA packet transmissions.

13. The apparatus as recited in claim 11, wherein said unsolicited retry policy for RTA packets in a multi-link scenario further comprises receiving a block acknowledgement (BA) frame to report packet loss of each link.

14. The apparatus as recited in claim 13, wherein block acknowledgement (BA) frames received by the multi-link device (MLD) on one link are configured to contain packet loss information for said first link and said other links.

15. The apparatus as recited in claim 13, wherein upon receiving a block acknowledgement (BA) frame by said multi-link device (MLD), packet loss information in the BA frame is utilized in determining which link to use for future RTA packet transmissions.

16. The apparatus as recited in claim 11, wherein said resetting the backoff time on said first link and said other links further comprises resetting the backoff time for an equal number of backoff slots on said first link and said other links.

17. An apparatus for wireless communication in a network, the apparatus comprising:
(a) a wireless communication circuit configured as a first wireless station for wirelessly communicating over at least one channel with at least one other wireless station on a local area network (WLAN) in a reception area of the first wireless station;
(b) said first wireless station including a processor configured for operating on the WLAN;
(c) a non-transitory memory storing instructions executable by the processor; and
(d) wherein said instructions, when executed by the processor, performing:
  (i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) and multi-link operations, in which real time application (RTA) traffic and non-RTA traffic coexist and RTA traffic is given a higher priority of transmission than lower priority traffic;
  (ii) distinguishing real-time application (RTA) packets from non-real-time application (non-RTA) packets;
  (iii) setting up an unsolicited retry policy for RTA packets in a multi-link scenario by a station which comprises a multi-link device (MLD) which is either an access point multi-link device (AP-MLD) which is configured for simultaneous transmit/receive (STR), or a non-access point multi-link device (non-AP MLD) which is not configured for simultaneous transmit/receive (non-STR);
  (iv) obtaining a TXOP, by said AP-MLD for transmitting to a non-AP MLD, commencing with setting backoff time on all the links to a random number for use in contending for the channel;
  (v) independently counting down backoff time by said AP-MLD on each link to gain channel access on each link when backoff time on that link counts down to zero;
  (vi) reserving the TXOP on a first link when it gains channel access;
  (vii) reserving the TXOP on other links if said AP-MLD gains channel access on other links before first link TXOP ends, and limiting the end time for a TXOP on those other links to be no later than the end time of TXOP of said first link; and
  (viii) failing to obtain the TXOP on said first link or said other links, when said AP-MLD does not gain channel access before TXOP ends for said first link.

18. The apparatus as recited in claim 17, wherein said unsolicited retry policy for RTA packets further comprises establishing an unsolicited retry limit, and controlling the unsolicited retry policy, including changing it or terminating it at any time.

19. The apparatus as recited in claim 17, wherein said instructions when executed by the processor further performing retransmitting the same MAC protocol data units (MPDUs) in the same TXOP when retransmitting RTA packets under said unsolicited retry policy.

20. The apparatus as recited in claim 17:
  wherein a PPDU comprises a Physical Layer Conformance Procedure (PLCP) Protocol Data Unit (PPDU); and wherein said instructions when executed by the processor further performing:
(a) enabling an Access Point (AP) station to retransmit RTA packets under said unsolicited retry policy by transmitting the initial transmission of the RTA packet on a Resource Unit (RU) of a Multi-User (MU) PPDU packet and its retransmission on another RU of that MU-PPDU packet; and/or
(b) a non-access point station retransmitting RTA packets under said unsolicited retry policy by transmitting an initial transmission of an RTA packet on a Resource Unit (RU) of a trigger based (TB) PPDU packet and its retransmission on another RU of that TB-PPDU packet.

* * * * *